United States Patent
Bevan et al.

(10) Patent No.: US 9,742,592 B2
(45) Date of Patent: Aug. 22, 2017

(54) PROCESSING INTERFERENCE IN A WIRELESS NETWORK

(71) Applicant: AceAxis Limited, Essex (GB)

(72) Inventors: David Bevan, Essex (GB); James Naden, Essex (GB); Simon Gale, Essex (GB); Fiona Wilson, Essex (GB)

(73) Assignee: ACEAXIS LIMITED, Essex (GB)

( * ) Notice: Subject to any disclaimer, the term of this patent is extended or adjusted under 35 U.S.C. 154(b) by 0 days.

(21) Appl. No.: 15/004,711

(22) Filed: Jan. 22, 2016

(65) Prior Publication Data
US 2016/0142229 A1 May 19, 2016

Related U.S. Application Data

(63) Continuation of application No. PCT/GB2014/052233, filed on Jul. 22, 2014.

(30) Foreign Application Priority Data

Jul. 22, 2013 (GB) .................................... 1313066.1

(51) Int. Cl.
*H04B 1/00* (2006.01)
*H04L 25/03* (2006.01)
(Continued)

(52) U.S. Cl.
CPC ....... *H04L 25/03006* (2013.01); *H04B 1/123* (2013.01); *H04B 17/0085* (2013.01); *H04L 27/122* (2013.01)

(58) Field of Classification Search
CPC .......... H04B 1/10; H04B 1/109; H04B 1/234; H04B 17/008; H04B 17/391; H04B 1/126;
(Continued)

(56) References Cited

U.S. PATENT DOCUMENTS 6,745,018 B1 * 6/2004 Zehavi .................. H04B 1/123
455/278.1
7,346,134 B2 * 3/2008 Smith .................... H04B 1/123
375/346
(Continued)

FOREIGN PATENT DOCUMENTS

GB      2502281 A    11/2013
GB      2502281 B    11/2013
(Continued)

OTHER PUBLICATIONS

UKIPO Combined Search and Examination Report dated Dec. 19, 2013 for GB Application No. GB1313066.1.
(Continued)

*Primary Examiner* — Simon Nguyen
(74) *Attorney, Agent, or Firm* — EIP US LLP

(57) ABSTRACT

Interference is processed in a waveform received at a device in a wireless network, the received interference comprising non-linear products of at least a first signal ($C_1$) at a first carrier frequency and a second signal ($C_2$) at a second carrier frequency. A complex composite baseband signal is generated comprising at least the first and second signal at baseband, occupying a respective first and second frequency range within a composite baseband frequency range and not overlapping in frequency. The complex composite baseband signal is processed by applying at least a first non-linear function (74a) to generate simulated interference comprising at least one simulated non-linear product. The received interference is then processed in dependence on the simulated interference.

20 Claims, 14 Drawing Sheets

(51) Int. Cl.
*H04B 1/12* (2006.01)
*H04B 17/00* (2015.01)
*H04L 27/12* (2006.01)

(58) Field of Classification Search
CPC .......... H04B 17/0087; H04L 25/03006; H04L 25/032547
USPC .................................. 455/295–296, 303–304
See application file for complete search history.

(56) References Cited

U.S. PATENT DOCUMENTS

| | | | |
|---|---|---|---|
| 2004/0048574 A1* | 3/2004 | Walker .................. | H03K 3/0315 455/63.1 |
| 2004/0048576 A1 | 3/2004 | Hildebrand et al. | |
| 2007/0184782 A1 | 8/2007 | Sahota et al. | |
| 2008/0039045 A1* | 2/2008 | Filipovic ................ | H04B 1/109 455/295 |
| 2009/0075610 A1* | 3/2009 | Keehr .................... | H04B 1/1018 455/137 |
| 2009/0086864 A1* | 4/2009 | Komninakis ............ | H04B 1/10 375/346 |
| 2011/0075754 A1 | 3/2011 | Smith | |
| 2012/0140860 A1 | 6/2012 | Rimini et al. | |
| 2012/0295558 A1 | 11/2012 | Wang et al. | |
| 2013/0044791 A1* | 2/2013 | Rimini .................. | H04B 1/109 375/219 |
| 2015/0139015 A1* | 5/2015 | Kadous ................. | H04W 24/08 370/252 |

FOREIGN PATENT DOCUMENTS

| | | |
|---|---|---|
| GB | 2508383 A | 6/2014 |
| GB | 2502279 B | 7/2014 |
| GB | 2511865 A | 9/2014 |
| WO | 2009082084 A1 | 7/2009 |

OTHER PUBLICATIONS

International Search Report and Written Opinion dated Nov. 3, 2014 for PCT Application No. PCT/GB2014/052233.
UKIPO Combined Search and Examination Report dated Dec. 12, 2014 for GB Application No. GB1412975.3.
UKIPO Decision to Grant dated Nov. 24, 2015 for GB Application No. GB1412975.3.

* cited by examiner $$(A\cos(a) + B\cos(b))^5 = \frac{5}{8} A^5 \cos(a) + \frac{5}{16} A^5 \cos(3a) + \frac{1}{16} A^5 \cos(5a) +$$
$$\frac{5}{4} A^4 B \cos(2a+b) + \frac{5}{16} A^4 B \cos(4a-b) + \frac{5}{4} A^4 B \cos(2a+b) +$$
$$\frac{5}{16} A^4 B \cos(4a+b) + \frac{15}{8} A^3 B^2 \cos(a+2b) + \frac{5}{4} A^3 B^2 \cos(3a-2b) +$$
$$\frac{5}{8} A^3 B^2 \cos(a+2b) + \frac{15}{8} A^3 B^2 \cos(3a+2b) + \frac{15}{4} A^3 B^2 \cos(3a-b) +$$
$$\frac{5}{4} A^2 B^3 \cos(2a-3b) + \frac{15}{4} A^2 B^3 \cos(2a-3b) + \frac{15}{4} A^2 B^3 \cos(2a-b) +$$
$$\frac{5}{8} A^2 B^3 \cos(2a+3b) + \frac{15}{4} A^2 B^3 \cos(2a+3b) + \frac{5}{8} A B^4 \cos(a-4b) +$$
$$\frac{5}{4} A B^4 \cos(a-2b) + \frac{15}{4} A^2 B^3 \cos(a+2b) + \frac{5}{16} A B^4 \cos(a+4b) +$$
$$\frac{5}{8} B^5 \cos(b) + \frac{5}{16} B^5 \cos(3b) + \frac{1}{16} B^5 \cos(5b)$$

$A = A_a(t); B = B_b(t) \rightarrow$ Amplitude Modulation (A.M.)

$a = 2\pi f_a t + \phi_a(t); b = 2\pi f_b t + \phi_b(t) \rightarrow$ carrier plus Phase Modulation (P.M.)

Figure 8

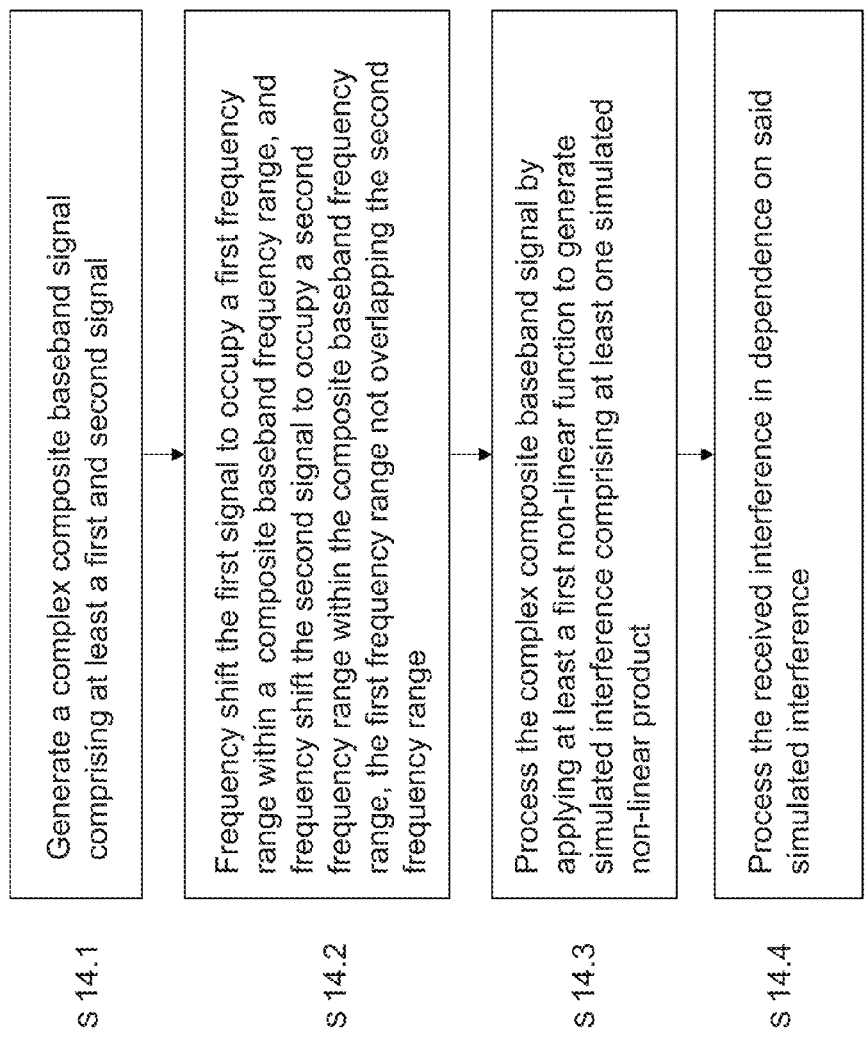

PROCESSING INTERFERENCE IN A WIRELESS NETWORK

CROSS-REFERENCE TO RELATED APPLICATIONS

This application is a continuation of International Application No. PCT/GB2014/052233, filed Jul. 22, 2014, which claims priority to Great Britain Application No. GB 1313066.1, filed Jul. 22, 2013. Each of the above-referenced patent applications is incorporated by reference in its entirety.

BACKGROUND OF THE INVENTION

Field of the Invention

The present invention relates generally to methods and apparatus for processing interference due to non-linear products of transmitted signals in a wireless network, and more specifically, but not exclusively, to detection and reduction of interference caused to a receiver due to passive intermodulation (PIM) products.

Description of the Related Technology

Non-linear products may be generated in a wireless network when one or more signals are transmitted along a signal path including a component having a non-linear transmission characteristic; these products may differ in frequency from the signal or signals from which they were generated, and may potentially cause interference to other signals. The generation of non-linear products is becoming a problem of increasing importance in modern wireless communication systems, and in particular cellular wireless systems, since the radio frequency spectrum available has been steadily expanded as additional bands have become available, and the pattern of allocation of uplink and downlink bands within the available spectrum for use by various cellular systems, such systems using GERAN (GSM EDGE Radio Access Network), UTRAN (UMTS Terrestrial Radio Access Network) and E-UTRAN (Evolved UMTS Terrestrial Radio Access Network) radio access networks, and by various operators, is complex and territorially dependent. In this environment, and in particular at a cellular radio base station, it is likely that circumstances arise in which non-linear products generated from transmitted carriers in one or more downlink bands would fall within an uplink band in which signals are received at the base station. Non-linear products generated by non-linear characteristics of active components such as power amplifiers may generally be dealt with at a design stage by appropriate frequency management and filtering, but non-linear products caused by non-linear characteristics of passive components, for example passive intermodulation (PIM) products, may prove more difficult to manage. Many passive components may exhibit a non-linear transmission characteristic to some degree, for example due to an oxide layer at a metal to metal contact, and the non-linear characteristic may develop with time as an ageing process of the component. Furthermore, PIM may be caused by components in the signal path between the transmitter and the receiver that are external to the transceiver equipment and which may be outside the operator's control, such as metallic objects on the antenna tower or other objects in the signal path through the propagation environment, such as fences; this is known as the "rusty bolt" effect.

Interference due to PIM may reduce the carrier to interference ratio at a receiver, which may reduce coverage by a cell significantly. Conventionally, as a solution to the problem of suspected interference caused by passive non-linear products in a cellular radio network, the source of the passive non-linear products may be tracked down by field engineers and a component causing the interference may be replaced. However, this is labor intensive and relies on the problem being identified in order to alert the field engineers.

Methods and apparatus for reduction and detection of intermodulation products have been disclosed in published in the applicant's GB patent applications GB2502279 and GB2502281. Simulated intermodulation products are generated and used to detect or reduce intermodulation products in a received signal.

It is an object of the invention to address improvements to reduction and detection of intermodulation products.

SUMMARY

In accordance with a first aspect of the present invention, there is provided a method of processing interference in a waveform received at a device in a wireless network, the received interference comprising non-linear products generated from at least a first signal at a first carrier frequency and a second signal at a second carrier frequency, the method comprising:

generating a complex composite baseband signal comprising at least the first and second signal at baseband, the first signal at baseband occupying a first frequency range within a composite baseband frequency range, and the second signal at baseband occupying a second frequency range within the composite baseband frequency range, the first frequency range not overlapping the second frequency range, by frequency shifting at least one of the first and second signals within the composite baseband frequency range;

processing the complex composite baseband signal by applying at least a first non-linear function to generate simulated interference comprising at least one simulated non-linear product; and processing the received interference in dependence on said simulated interference.

Shifting the frequencies of the first and second signals within the composite baseband frequency range in this way allows a simplified and more efficient signal processing architecture to be implemented, in which the simulated interference is generated by applying the non-linear function to the complex composite baseband signal, rather than requiring individual signals to be multiplied together to generate simulated interference by using a complex algebraic model of the intermodulation term of interest.

In an embodiment of the invention, said first non-linear function generates a first non-linear term with a first exponent value and is configured to generate non-linear products having the phase of the composite complex baseband signal and having an amplitude linearly related to the amplitude of the complex composite baseband signal raised to the power of the respective exponent value.

This allows simulated interference related to a respective exponent value to be conveniently generated.

In an embodiment of the invention, the first non-linear function generates a non-linear term with an exponent value n and has the form:

$|A|^{n-1}A$, wherein A is the complex composite baseband signal.

This allows simulated interference related to a respective exponent value n to be conveniently generated.

In an embodiment of the invention, the method comprises:

processing the complex composite baseband signal by applying a plurality of non-linear functions, each non-linear function relating to a respective exponent value, to generate a plurality of simulated non-linear products, wherein said simulated interference comprises said plurality of simulated non-linear products.

This allows non-linear products relating to a plurality of exponent values to be conveniently generated. For example, third order products, amongst other products, relating to both exponent 3 and exponent 5 values may be generated.

In an embodiment of the invention, the method comprises:

frequency shifting selected ones of said plurality of simulated non-linear products by a respective frequency shift, the respective frequency shift being configured to align the respective simulated non-linear product with a respective non-linear product in the received interference.

This allows the simulated non-linear products in the simulated interference to be aligned in frequency with non-linear products in the received interference, where the non-linear products in the received interference may also have been frequency shifted, for example to baseband or a composite baseband, or some other intermediate frequency. The alignment allows a correlation operation and/or a cancellation operation to be efficiently performed.

In an embodiment of the invention, the respective frequency shift is used to align simulated non-linear products of the same order for a plurality of exponent values. This allows an efficient implementation.

In an embodiment of the invention, the method comprises:

configuring a guard band between the first frequency range and the second frequency range, the width of the guard band in frequency being configured to limit a degree of overlap in frequency between a simulated non-linear product corresponding to a non-linear product in the received interference and another non-linear product generated by the same non-linear function.

This allows simulated non-linear products to be processed independently of one another. For example they may be frequency shifted, phase and amplitude shifted, orthogonalized and correlated independently of each other. In an embodiment of the invention, the received interference comprises non-linear products of at least the first signal at the first carrier frequency, the second signal at the second carrier frequency and a third signal at a third carrier frequency, and wherein the complex composite baseband signal comprises at least the first, second and third signals at baseband.

This allows processing of interference caused, for example, by intermodulation products of three or more signals.

In an embodiment of the invention, the method comprises:

generating the complex composite baseband signal to comprise at least the first, second, and third signal at baseband, by frequency shifting the third signal to occupy a third frequency range within the complex composite baseband frequency range, the third frequency range not overlapping the first or second frequency range.

Shifting the frequencies of the first, second, and third signals in this way allows a simplified and more efficient signal processing architecture to be implemented, in which the simulated interference is generated by applying the non-linear function to the composite complex, that is to say inphase and quadrature (IQ) baseband representation, rather than requiring individual signals to be multiplied together to generate simulated interference.

In an embodiment of the invention, the method comprises configuring a guard band between each frequency range, the width of each guard band in frequency being configured to be sufficient to limit a degree of overlap between said at least one simulated non-linear product and another non-linear product generated by the same non-linear function.

This allows simulated non-linear products to be processed independently of one another. For example they may be frequency shifted, phase and amplitude shifted, orthogonalized and correlated independently of each other.

In an embodiment of the invention, the method comprises:

configuring the difference in frequency between the center of the first frequency range and the center of the second frequency range to be different from the difference in frequency between the first carrier frequency and the second carrier frequency.

It is not obvious that simulated interference may be generated by configuring the difference in frequency between the center of the first frequency range and the center of the second frequency range in the composite baseband signal to be different than the difference in frequency between the first carrier frequency and the second carrier frequency at which the received non-linear products were generated. It may have been expected that the difference at baseband would need to be the same as the difference between the first and second carrier frequencies, in order to generate simulated interference that could be used to process the received interference. Configuring the frequency differences at baseband and carrier frequency to be different from each other allows flexibility in positioning the first and second signals in the complex baseband representation, potentially simplifying implementation.

In an embodiment of the invention, the method comprises:

correlating said at least one simulated non-linear product with a representation of the waveform received at the device to produce data representing a correlation; and processing the interference in dependence on the data representing the correlation.

The correlation may allow a match between the received interference and the simulated interference to be detected, and also the phase and amplitude relationship between the received interference and the simulated interference to be determined.

In an embodiment of the invention, the method comprises:

weighting each of at least the first, second, and third signals by a respective complex weighting function;

configuring the complex composite baseband signal to comprise the weighted first, second, and third signals, the first second and third signals having the same spacing in frequency from one another at composite baseband as they have at carrier frequency, such that processing the complex composite baseband signal by applying at least a first non-linear function generates simulated interference having overlapping non-linear products;

correlating the simulated interference with a representation of the waveform received at the device to produce correlation data;

adjusting the respective weighting functions in dependence on the correlation data;

correlating simulated interference generated using adjusted respective weighting functions with a representation of the waveform received at the device to produce data representing a correlation; and processing the interference in dependence on the data representing the correlation.

This allows a correlation to be performed as the basis for the detection and/or cancellation of interference caused, for example, by intermodulation between three signals, in the case where the spacing between the signals at composite baseband is not increased to separate the simulated non-linear products in frequency. This has the advantage that the bandwidth and sampling rate of the composite baseband may be reduced compared with the case where guard bands are used.

In an embodiment of the invention, said processing of the interference in dependence on the data representing the correlation comprises reducing a level of a non-linear product of at least the first signal and the second signal in the received interference by:

detecting an amplitude and phase of the correlation;

weighting at least said simulated interference in dependence on the detected amplitude and phase; and combining the weighted simulated interference with a frequency-shifted representation of the waveform received at the device.

This allows cancellation of interference using non-linear products when generated by the non-linear function.

In an embodiment of the invention, said processing of the interference in dependence on the data representing the correlation comprises:

detecting the presence of a non-linear product of at least the first signal and the second signal in the received interference in dependence on the data representing of the correlation.

This allows the detection of interference that correlates with the simulated interference.

In an embodiment of the invention, the first signal is transmitted within a first cellular frequency band and the second signal is transmitted within a second cellular frequency band, the first and second cellular frequency bands not being contiguous.

This allows first and second signals in different frequency bands, which may be widely spaced in frequency, to be used to generate simulated interference based on a complex composite baseband signal comprising the two signals. This may be an efficient process for generating simulated interference. It is, in particular, not obvious to combine signals from two different bands into a composite baseband signal.

In an embodiment of the invention, said non-linear products generated from at least the first signal and the second signal in the received interference comprise at least one passive intermodulation (PIM) product of at least the first signal and a second signal.

In an embodiment of the invention, the method comprises generating the complex composite baseband signal on the basis of samples of at least the first signal and the second signal derived at baseband from a downlink data stream from a base station baseband unit to a remote radio head unit.

This provides a convenient source of at least the first and second signal.

In an embodiment of the invention the downlink data stream is Common Public Radio Interface (CPRI) or Open Base Station Architecture Initiative (OBSAI) data stream.

In an embodiment of the invention, the method comprises generating the complex composite baseband signal on the basis of at least one downconverted signal coupled from a radio frequency transmit signal.

This provides a convenient method of obtaining for example the first and/or second signal, in particular if access to a downlink data stream carrying the first and/or second signals is not available.

In accordance with a second aspect of the present invention, there is provided apparatus for processing interference in a waveform received at a device in a wireless network, the received interference comprising non-linear products generated from at least a first signal at a first carrier frequency and a second signal at a second carrier frequency, the apparatus comprising a signal processor configured to:

generate a complex composite baseband signal comprising at least the first and second signal at baseband, by frequency shifting at least one of the first and second signals within the composite baseband frequency range so that the first signal at baseband occupies a first frequency range within the composite baseband frequency range the second signal at baseband occupies a second frequency range within the composite baseband frequency range, the first frequency range not overlapping the second frequency range;

process the complex composite baseband signal by applying at least a first non-linear function to generate at least one simulated non-linear product; and process the received interference in dependence on said simulated interference.

Further features and advantages of the invention will be apparent from the following description of preferred embodiments of the invention, which are given by way of example only.

BRIEF DESCRIPTION OF THE DRAWINGS

FIG. 8 shows generation of non-linear products from two signals operated on at a non-linear device by a non-linear function having an exponent 5 term, illustrating that the products generated include third order terms;

FIG. 14 is a flow diagram of a method of processing interference according to an embodiment of the invention.

DETAILED DESCRIPTION OF CERTAIN INVENTIVE EMBODIMENTS

Figure 1:
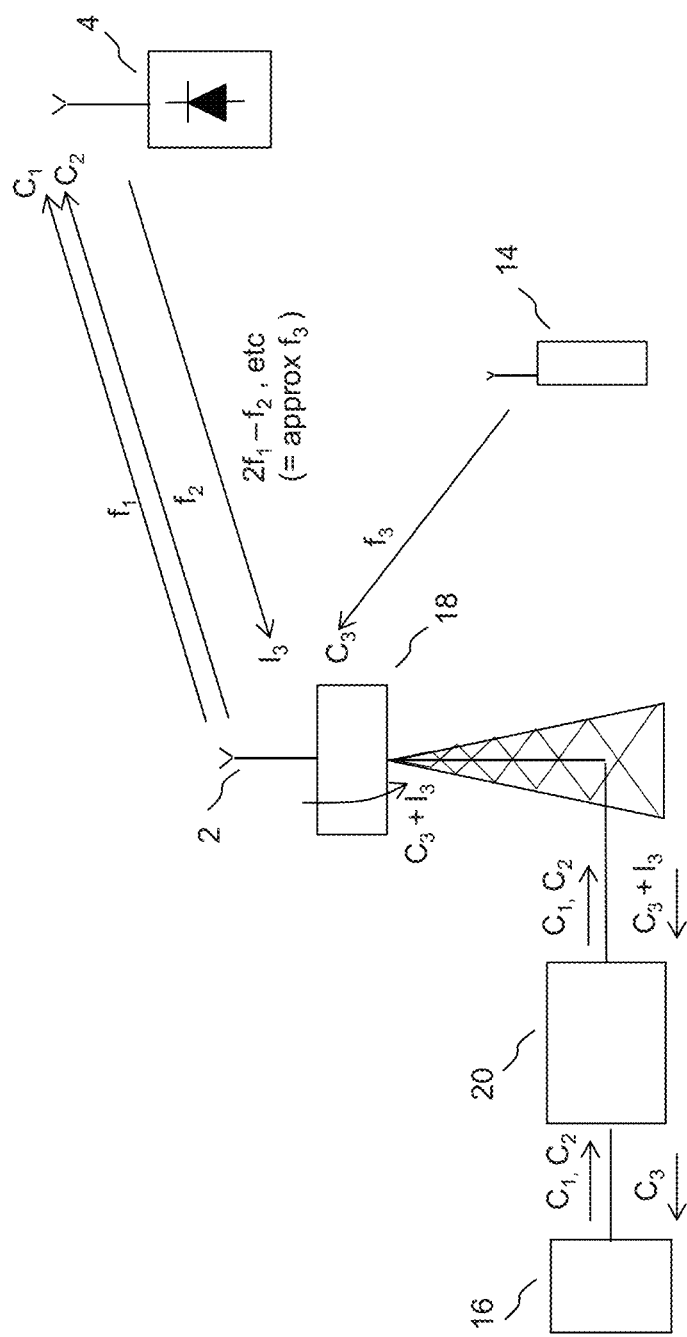
FIG. 1 is a is schematic diagram illustrating an example of interference caused by passive non-linear products.

By way of example, embodiments of the invention will now be described in the context of detection and reduction of interference caused by non-linear products, typically passive intermodulation (PIM) products, in cellular wireless networks such as GSM, 3G (UMTS) and LTE (Long Term Evolution) networks comprising GERAN, UTRAN and/or E-UTRAN radio access networks, but it will be understood that embodiments of the invention may relate to other types of radio access network, for example IEEE 802.16 WiMax systems, and that embodiments of the invention are not restricted to cellular wireless system. Furthermore, embodiments of the invention may also relate to reduction of interference caused by intermodulation or harmonics in active components.

In an embodiment of the invention, simulated interference is generated from baseband representations of signals which have caused interference to a received waveform, for use in detecting or reducing the received interference. The generated simulated interference is also at baseband. It would be possible to generate the baseband interference products by multiplying together the signals causing the interference by using a complex algebraic model of the intermodulation term of interest, to produce a baseband representation of a specific intermodulation product which is expected to fall in the receive band. By this method, each intermodulation term of interest would be codified with an algebraic model and separately generated. By contrast, in an embodiment of the present invention, a different approach is taken to generating simulated interference products, which may be referred to as a Composite IQ Baseband (CIB) approach. First a complex composite baseband signal is composed by offsetting in frequency representations of the signals causing the interference so that they do not overlap, and so that they are spaced appropriately in frequency to leave room for the intermodulation products that are to be generated. Then the complex composite baseband signal is passed through a non-linear function, to produce a number of different intermodulation products. The intermodulation term of interest is then filtered out from the intermodulation products produced. The frequency offset between the signals used to generate the intermodulation products may be set so that the intermodulation product of interest is not interfered with by another intermodulation product being generated in the non-linear function. It has been found that the frequency spacing between the signals used to generate the intermodulation products need not be the same as the frequency spacing of the signals that were transmitted at radio frequency to cause the received interference. As a result, it is possible to create an efficient mechanism for generating simulated interference by appropriate offsetting of the signals in the complex composite baseband signal to make efficient use of the available bandwidth determined by the sampling rate at baseband. It may be more efficient to implement the CIB approach, for example as a programmable gate array, than to implement the approach of generating a complex algebraic model of each term of interest.

FIG. 1 shows an example of a scenario in which interference $I_3$ due to non-linear products, such as PIM, may be experienced in a received waveform in a cellular wireless network, and the interference may be detected and/or reduced by detector/canceller apparatus 20 in an embodiment of the invention. The detector/canceller apparatus may operate, in the embodiment, by generating simulated non-linear products that simulate non-linear products that may be present in the received interference, and then by correlating each simulated non-linear product with the received waveform. From the correlation, it may be established whether or not a corresponding non-linear product is in fact present in the received waveform, and if it is, what the amplitude and phase relationship is between the received non-linear product and the simulated non-linear product. Each simulated non-linear product may then be combined with the received waveform with an appropriate amplitude and phase relationship, determined from the correlation, to cancel or at least reduce the interference in the received waveform.

The detector/canceller apparatus 20 may generate a simulated non-linear product in the form of a stream of time samples, and may generate several such interference product streams. Each stream may be appropriately weighted and combined with the received waveform to reduce each of the non-linear products in the received interference. The simulated non-linear products may be generated by first generating a complex composite baseband signal comprising signals that are candidates for causing intermodulation interference to the received waveform. The signals are frequency shifted so that they do not overlap, and at least one non-linear function is applied to the complex composite baseband signal to generate the simulated non-linear products. The signals may also be frequency shifted so that the simulated non-linear products do not overlap.

Relative delays and frequency offsets between the received and simulated non-linear products may be determined by a trial of candidate values, and appropriate values may be selected on the basis of increasing, or maximizing, the value of a correlation between the received and simulated non-linear products. The processed streams may then be combined with the received waveform, using the determined relative delays and frequency offsets and the amplitude and phase weights.

Considering further the scenario illustrated in FIG. 1, a first downlink signal $C_1$ and a second downlink signal $C_2$ are sent at baseband from a base station modem unit 16 to a Remote Radio Head (RRH) unit 18 as a data stream on a data link such as a Common Public Radio Interface (CPRI) data link. The data link carries both uplink and downlink CPRI data streams. The base station modem unit may be referred to as a baseband unit, and is typically, although not necessarily, mounted in a cabinet on the ground. The Remote Radio Head comprises upconverter and downconverter units and is typically, but not necessarily, mounted on a tower at the base station next to the antenna 2 or antennas. The first signal $C_1$ and second signal $C_2$ are upconverted to radio frequency and are transmitted at frequency $f_1$ and frequency $f_2$ respectively. In the example shown in FIG. 1, the first and second signals impinge upon a source 4 of non-linear interference products such as passive intermodulation products (PIM) products. The source may, for example, be a metallic component having an oxide layer between metallic parts or comprising a ferromagnetic material. The source may be an antenna or a component of the RRH 18 such as, for example a diplexer, or the source may be a component remote from the antenna or RRH, such as an oxidized component on an antenna tower. In addition to PIM products, Passive Harmonic products of each of the first signal and the second signal may be generated.

Figure 2:
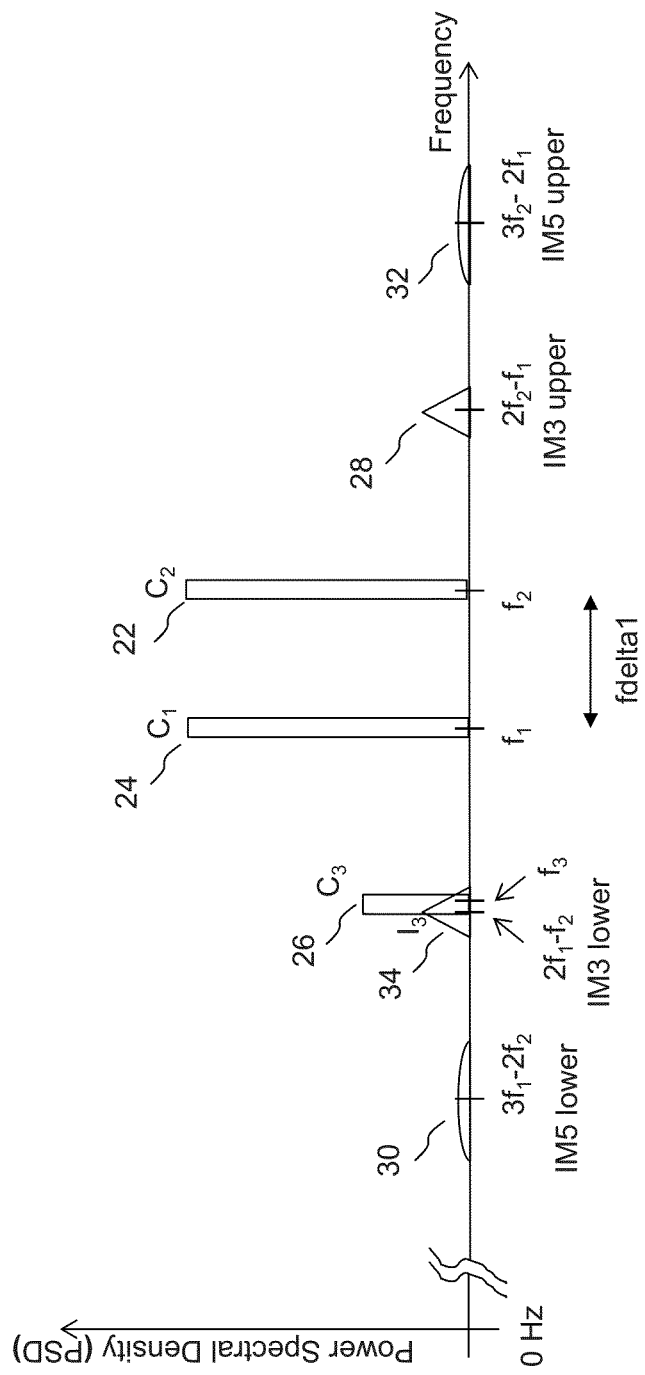
FIG. 2 is a schematic diagram illustrating passive non-linear products in the frequency domain.

FIG. 2 shows intermodulation products in the frequency domain. It can be seen that the first signal 24 at frequency $f_1$ and the second signal 22 at frequency $f_2$ may produce, for example, third order products 34, 28 at frequencies $2f_1-f_2$ and $2f_2-f_1$, and fifth order products 30, 32 at frequencies $3f_1-2f_2$ and $3f_2-2f_1$. Other products (not shown) may also be generated.

In the case illustrated by FIG. 2, an uplink signal, i.e. a received signal $C_3$ 26 at frequency $f_3$ falls within the frequency spectrum occupied by the low side third order intermodulation products 34. It can be seen that there is typically an offset between the frequency of the received signal 26 and the center of the frequency spectrum occupied by the low side third order intermodulation products 34, since there is typically no reason to expect the frequencies to be equal. The intermodulation products typically occupy a broader band than the signals from which they are generated, and there may be more than one received signal falling within the spectrum occupied by the intermodulation products.

Referring again to FIG. 1, it can be seen that intermodulation products $I_3$ of the first and second signals are transmitted from the PIM source 4, in this example at $2f_1-f_2$. The intermodulation products $I_3$, in this example, fall at least in part, within a received uplink channel at $f_3$ and appear as interference to a received signal $C_3$ that is transmitted at radio frequency from, for example, a user equipment 14 in communication with the base station. The received signal $C_3$ and the intermodulation products $I_3$ appearing as interference to the received signal are received in a waveform at a device in the wireless network; the device may be for example an antenna, in the case that the interference is generated externally to the receiving radio system, or the device may for example be a component of the receive chain of the receiving radio system, for example a baseband processor, in the case that the interference is generated in the receiving radio system itself, such as for example PIM generated in the antenna or a diplexer. The received waveform may be downconverted to baseband in the RRH 18 and sent on the data link to the baseband/modem unit 16. The designations $C_1$, $C_2$ and $C_3$ are used to designate the first, second, and third signals irrespective of the carrier frequency. That is to say, the first signal may be designated as C1 at radio frequency as transmitted by an antenna, but it is also designated as C1 and referred to as the first signal at baseband, that is to say at zero or near zero intermediate frequency. Similarly, the term "received waveform" is used to refer to radio frequency, intermediate frequency or baseband representation of the received waveform, independently of carrier frequency. The received waveform may be in analogue or sampled data form.

In an embodiment of the invention, as shown in FIG. 1, apparatus 20 is provided for reduction of interference to a received signal on at least a single receive channel caused by non-linear products of at least the first signal and the second signal, the first and second signals being downlink signals. The first and second signals $C_1$ and $C_2$ are received at baseband at the apparatus, for example from the data link from the base station modem unit. The apparatus (which may be referred to as a PIM canceller) may select the first signal $C_1$ and the second signal $C_2$ on the basis of a determination of which downlink signal frequencies may produce non-linear products that may fall within a channel of interest that carries the received signal, based on well known relationships between signal frequencies and the frequencies of non-linear products produced from those frequencies. On the basis of this determination, the appropriate first and second downlink signals C1 and C2 may be selected for generation of simulated, that is to say synthesized, non-linear products. On the basis of the first signal and the second signal, simulated non-linear products are generated. The non-linear product or products that are generated may be selected on the basis of which non-linear products would be expected to fall in the channel of interest.

Figure 3:
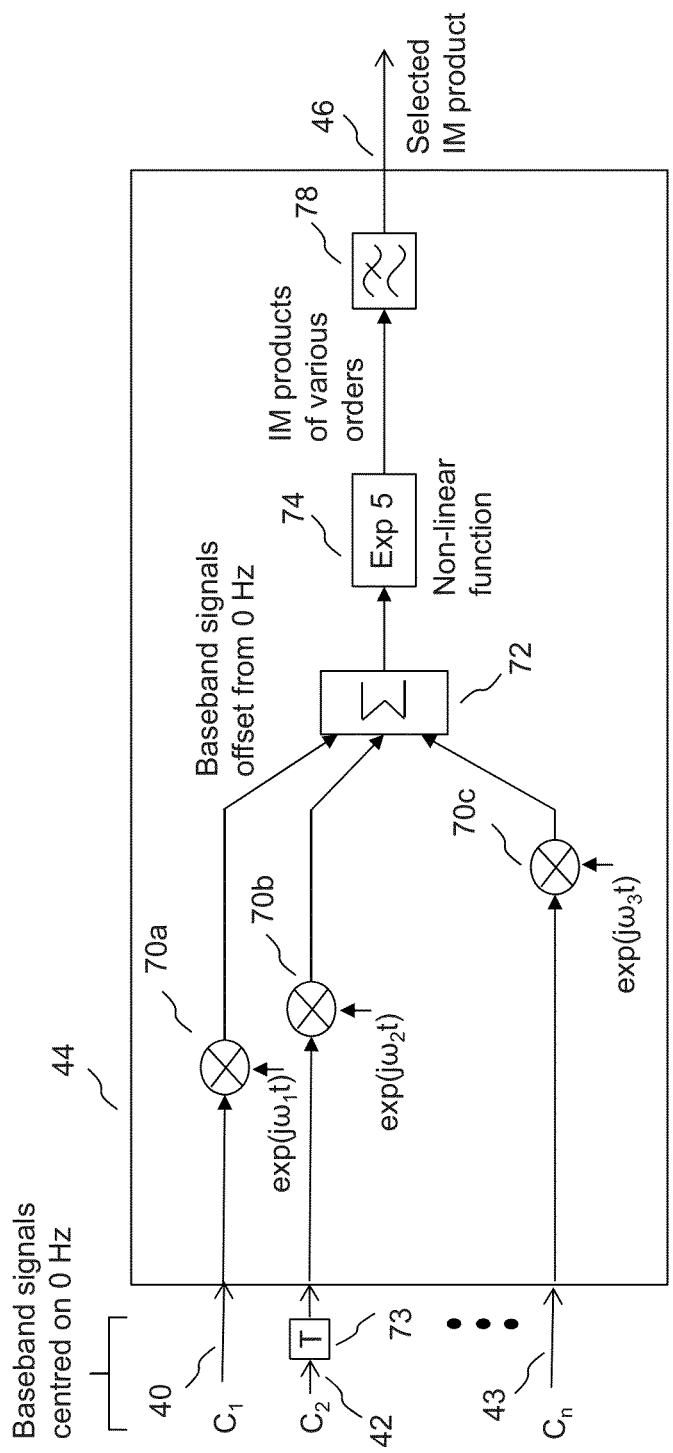
FIG. 3 is a schematic diagram showing generation of a stream of interference products of a selected order by applying a non-linear function of exponent 5 to a composite baseband signal in an embodiment of the invention.
Figure 7:
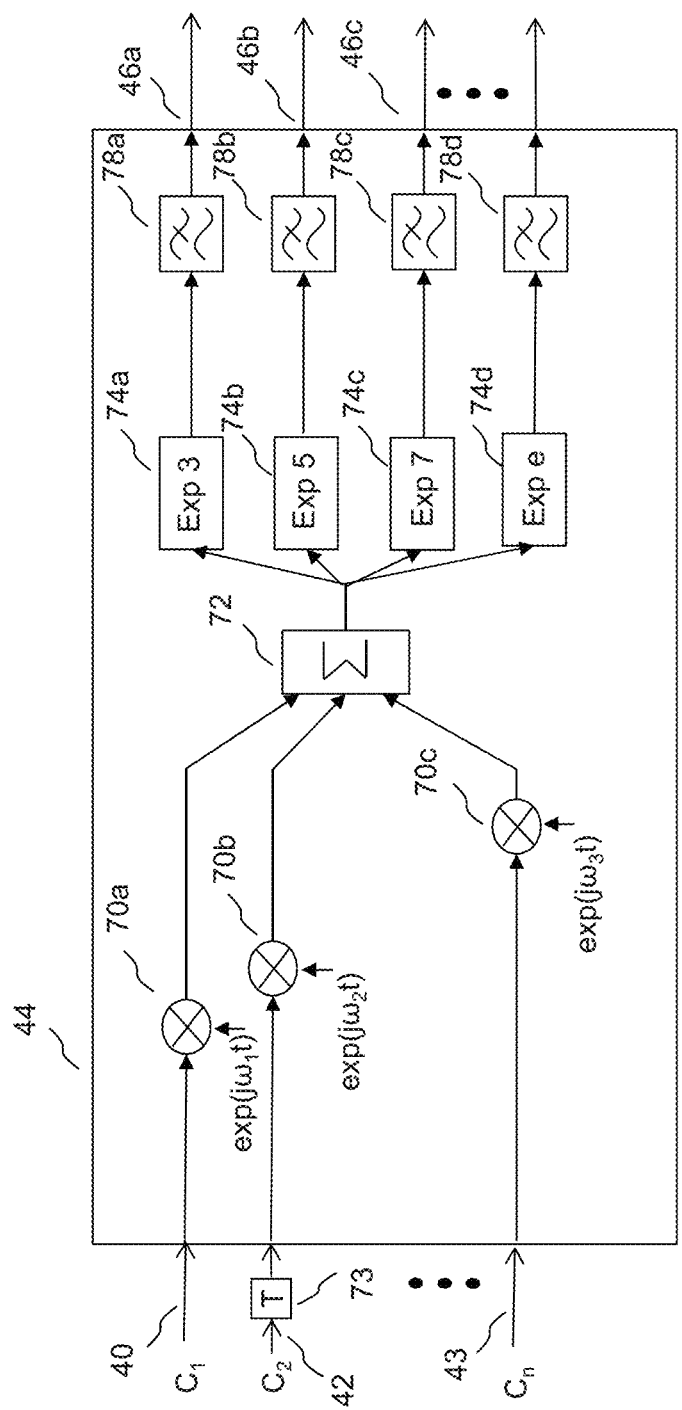
FIG. 7 is a schematic diagram showing generation of a plurality of streams of interference products of a selected order by applying non-linear functions of several exponents to a composite baseband signal in an embodiment of the invention.

FIG. 3 illustrates generation of a stream of simulated interference products in an embodiment of the invention. Firstly, baseband representations of signals 40, 42, 43 which are hypothesized to have caused the intermodulation interference which is to be detected and/or cancelled are obtained at baseband, centered on zero Hertz, i.e. not yet offset in frequency. They may be conveniently obtained from a baseband data stream carrying signals to a base station radio head to be transmitted. Some or all of the signals may need to be delayed, for example by delay element 73, so that the simulated interference matches up in time with the interference caused by the transmitted signals. Some or all of the baseband signals are then offset from zero Hertz, for example in digital complex mixers 70a, 70b, 70c, by appropriate frequency offsets that are arranged so that the simulated interference products of interest do not overlap each other, or at least do not overlap sufficiently to cause significant interference, and appear at a frequency that can be conveniently filtered, for example by a low pass filter 78 if the products are arranged to encompass 0 Hertz, to provide an output stream of time samples 46 of a simulated interference product of interest. The simulated interference products are generated by passing the complex composite baseband signal through a non-linear function. The non-linear function is typically arranged to generate non-linear products for a particular exponent value. For example, if it has been established that a third order product of two particular transmitted signals may cause intermodulation products that would fall in a receive band of interest, then those third order products would need to be generated to cancel or detect the interference in the receive band. Third order products may be generated, for example, by non-linear functions with odd exponents. So, in this example, non-linear functions with exponent 3, exponent 5, exponent 7 etc. may be used to generate streams of third order products, which may be separately correlated with the incoming waveform and separately weighted for combining with the incoming waveform to cancel or reduce the interference. FIG. 3 shows one non-linear function of exponent 5. FIG. 7 shows several non-linear functions 74a, 74b, 74c, 74d of different exponents operating in parallel. In addition, each exponent may generate a stream of simulated intermodulation products for each of several orders of intermodulation product by appropriate filtering.

The non-linear function may be configured to generate non-linear products having the phase of the complex composite baseband representation of at least the first and second signal and having an amplitude linearly related to the amplitude of the composite baseband representation raised to the power of the respective exponent value, for example using the expression $|A|^{n-1}A$, where A is the complex composite baseband representation of at least the first and second signal, and n is the exponent term. The expression $|A|^{n-1}A$ may be used as a non-linear function to generate odd order difference terms, for cases where the term m, the sum of the non-linear product coefficients, is one. For example, where there are two frequencies f1 and f2 with corresponding coefficients k and j, the non-linear product may be generated at a frequency $kf_1+jf_2$ and the term m will be given by k+j. For products such as $2f_1-f_2$, m is seen to equal one.

The non-linear function may be extended to more cases using the expression $|A|^{n-m}A^m$. For example the expression becomes $|A|^n$ for generation of even order difference terms such as $f_2-f_1$ where m=0. There may be cases where more frequencies are present and m will then correspond to the sum of all coefficients.

Figure 4:
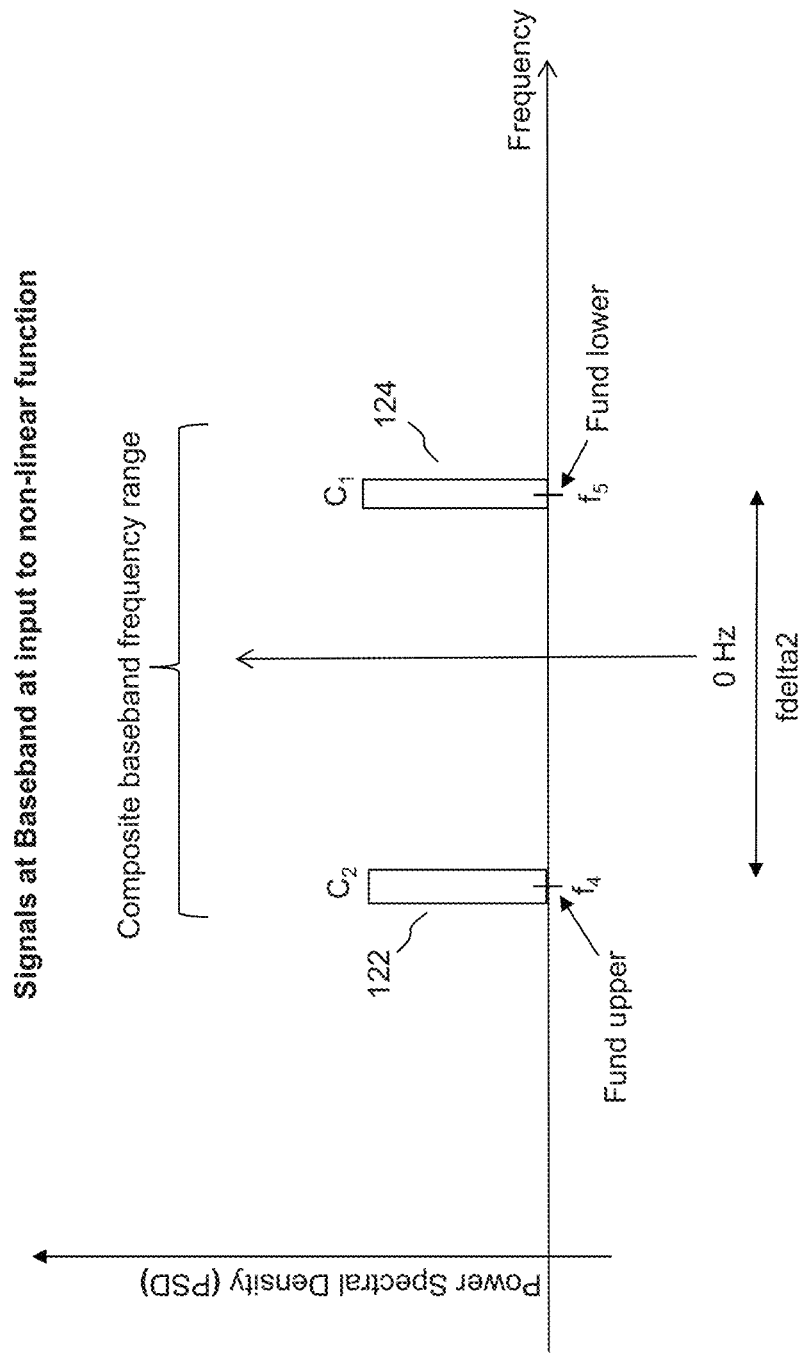
FIG. 4 shows an arrangement of signals in the composite baseband frequency range at the input to a non-linear function in an embodiment of the invention.

FIG. 4 shows the complex composite baseband signal, also referred to as the composite baseband signal, comprising first and second signals at baseband at the input to a non-linear function. The first and second signals are offset from each other by a frequency offset fdelta 2, which may be different from the frequency offset fdelta 1 between the first and second signals causing the interference at carrier frequency as shown in FIG. 2. Depending on the arrangement of carrier frequencies and on the intermodulation terms of interest, it may be advantageous to set fdelta 2 to be greater than, less than or the same as fdelta 1. Furthermore, it may be the case as illustrated in FIG. 4 that the first signal is at a lower frequency at carrier frequency than is the second signal, but at a higher frequency at baseband than the second signal.

Figure 5:
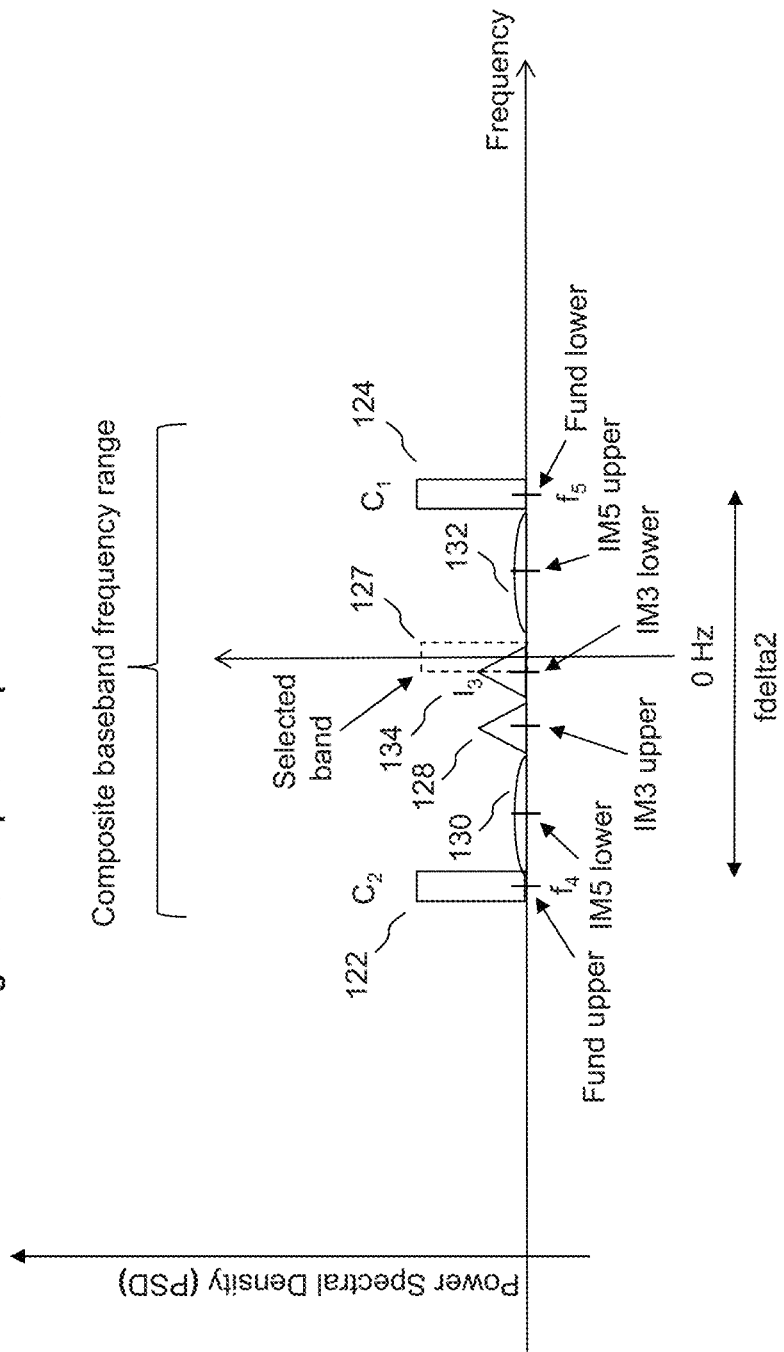
FIG. 5 shows in diagrammatic form an example of signals within the composite baseband frequency range generated by a non-linear function of exponent 5 in an embodiment of the invention.

FIG. 5 shows an example of how the intermodulation products produced from the composite baseband signal by the non-linear function are arranged within the composite baseband frequency range by appropriate choice of frequency for the first and second signal 122, 124. In particular, in this case the IM3 lower term 134 is the term which is intended to be used to generate simulated interference, and this has been arranged to fall within the selected band 127 which will fall within the pass band of the output filter 78. The other third order and fifth order terms generated 130, 128, 132 are arranged not to interfere by more than an acceptable degree with the term of interest by appropriate selection of the frequency of the first and second signal in the composite baseband signal. In this particular case the digital sampling frequency has undersampled the intermodulation products and thus the intermodulation products have been aliased to the positions shown within the composite baseband frequency range. Comparison of FIG. 5 with FIG. 2 illustrates how the various signals are shifted in frequency between carrier frequency, which may be referred to as radio frequency, and baseband in an embodiment of the invention.

Figure 6:
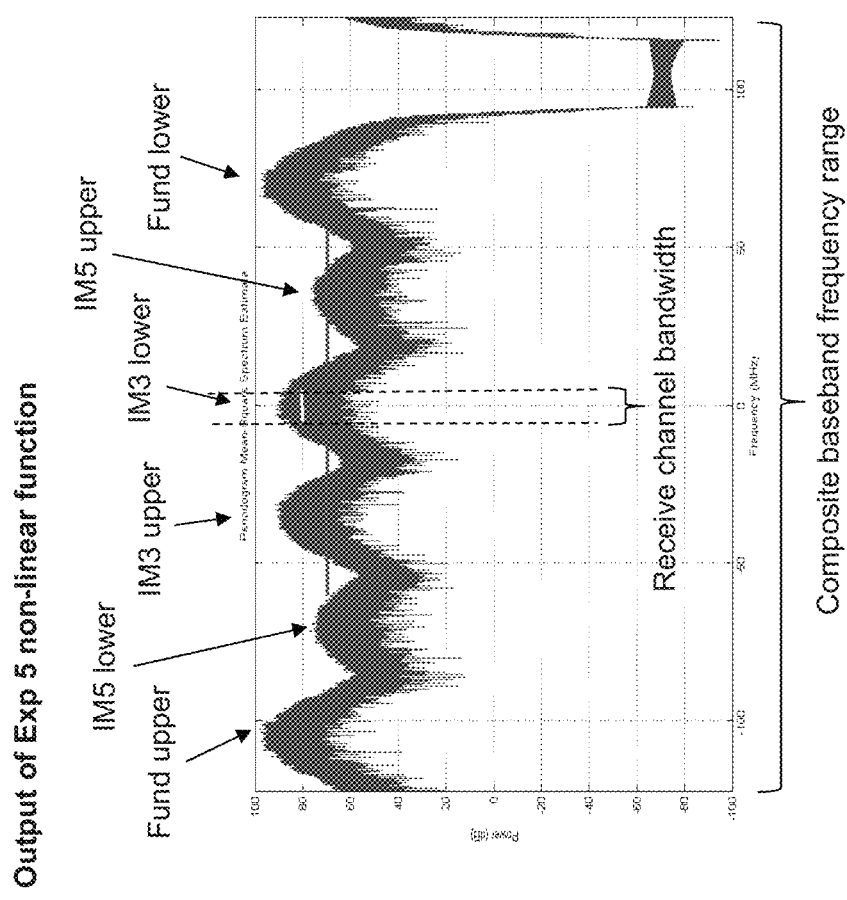
FIG. 6 is a simulation result showing an example of signals within the composite baseband frequency range generated by a non-linear function of exponent 5 in an embodiment of the invention.

FIG. 6 shows the output of a computer simulation of a situation similar to that shown diagrammatically in FIG. 5. In particular, interference from the IM5 upper and IM3 upper terms is avoided in the part of the generated IM3 term of interest that would fall within the band of interest for generation of the simulated interference signal, which is the part falling within the indicated receive channel bandwidth.

In an embodiment of the invention, the first and second signal are processed to generate interference product streams, each stream comprising a stream of time samples of a simulated non-linear product of at least the first signal. For example, streams of third order intermodulation products of two signals may be generated. Similar principles apply to generation of other non-linear products and non-linear products of other orders. Several third order intermodulation products can be generated by an exponent 3 non-linear term, and that several further third order products may be generated by an exponent 5 term, and also yet further third order products may be generated by other odd exponent terms. An exponent 3 term is a term of the form $x^3$ in a transfer function of a non-linear device generating interference, or in a corresponding function for generating simulated non-linear products to cancel the interference, and in general an exponent n term is a term of the form $x^n$.

Not all third order intermodulation products that are generated will fall within a band of interest corresponding to a received waveform, potentially representing interference to a received signal.

So, in order to cancel interference in a received waveform, potentially interfering non-linear products may be selected for generation as streams of time samples of simulated non-linear products, and non-linear products that would fall outside the band of interest may be neglected.

So, interference product streams may need to be generated for each of several non-linear products, the non-linear products not necessarily all relating to the same exponent term.

Considering non-linear products generated at radio frequency in a non-linear device by an exponent 3 term in the transfer function of the device, from two signals each signal having amplitude modulation A and B respectively, and a phase comprising carrier phase and phase modulation a and b respectively, products due to a non-linearity with exponent 3 are given by:

$(A \cos(a)+B \cos(b))^3$ which may be expanded to give:

$$\frac{1}{4}(3A^3\cos(a) + A^3\cos(3a) + 3A^2B\cos(2a-b) + \\ 3A^2B\cos(2a+b) + 3AB^2\cos(a-2b) + 3AB^2\cos(a+2b) + \\ 6AB^2\cos(a) + 6A^2B\cos(b) + 3B^3\cos(b) + B^3\cos(3b))$$

The terms of the expansion which are of interest in the present example, in that they may fall in an uplink receive band, are the terms $3A^2B \cos(2a-b)$, which represents the lower third order product as shown in FIG. 2 as $I_3$ as indicated by reference numeral 34, and $3AB^2 \cos(a-2b)$, which may also be written as $3AB^2 \cos(2b-a)$, which represents the upper third order product as shown as indicated in FIG. 2 by reference numeral 28. Products which appear at the fundamental frequencies, and at or around the third harmonics need not be generated, in some embodiments, as baseband intermodulation products in the PIM canceller, since they may be filtered out at a victim receiver. Which of the 'upper' or 'lower' products falls in an uplink receive band will depend upon whether the uplink band is allocated above or below the downlink band. The mathematics above shows that the intermodulation products contain amplitude and phase modulation which is a function of modulation of the first and second signals which generated the intermodulation products, so that baseband intermodulation products may be generated in the PIM canceller from the knowledge of the amplitude and phase of the first and second signals; this information is available in a baseband representation of the first and second signals. For example, to cancel interference $I_3$ as shown in FIG. 2, the lower third order products may be selected for generation as interference product streams.

However, in addition to the generation of third order intermodulation products by exponent 3 terms, i.e. cube terms, in a device transfer function, intermodulation products may also be generated at the frequencies expected for third order products, such as $2f_1-f_2$ and $2f_2$ by exponent terms in a device transfer function of exponents 5, 7, 9, and potentially by any odd power device nonlinearities, where the power is at least as great as the power of the respective term of the device transfer function. Correspondingly, intermodulation products normally termed as 'fifth order' can actually be generated by carrier frequency non-linear device nonlinearities of exponents 5, 7, 9 and all higher odd exponent device nonlinearities. The pattern continues in this way for higher (odd) order intermodulation products (i.e. 'seventh', 'ninth' etc.), which can be generated not only by device nonlinearities of the same exponent, but also by device nonlinearities of higher odd exponents.

FIG. 8 shows an example of a mathematical expansion of $(A \cos(a)+B \cos(b))^5$, illustrating the generation of intermodulation products by an exponent 5 term in a non-linear device transfer function at carrier frequency. The terms within broken lines have been highlighted as terms that may typically fall within a receive band in some arrangements of cellular radio uplink and downlink frequencies. In particular, the terms include $\cos(2a-b)$, and $\cos(a-2b)$, which correspond to the frequencies $2f_1-f2$ and $2f_2-f_1$. Therefore, it may be seen that knowledge of, or estimation of, the mechanism for generating intermodulation products at radio frequency may be used to generate corresponding simulated intermodulation products at baseband.

Figure 9:
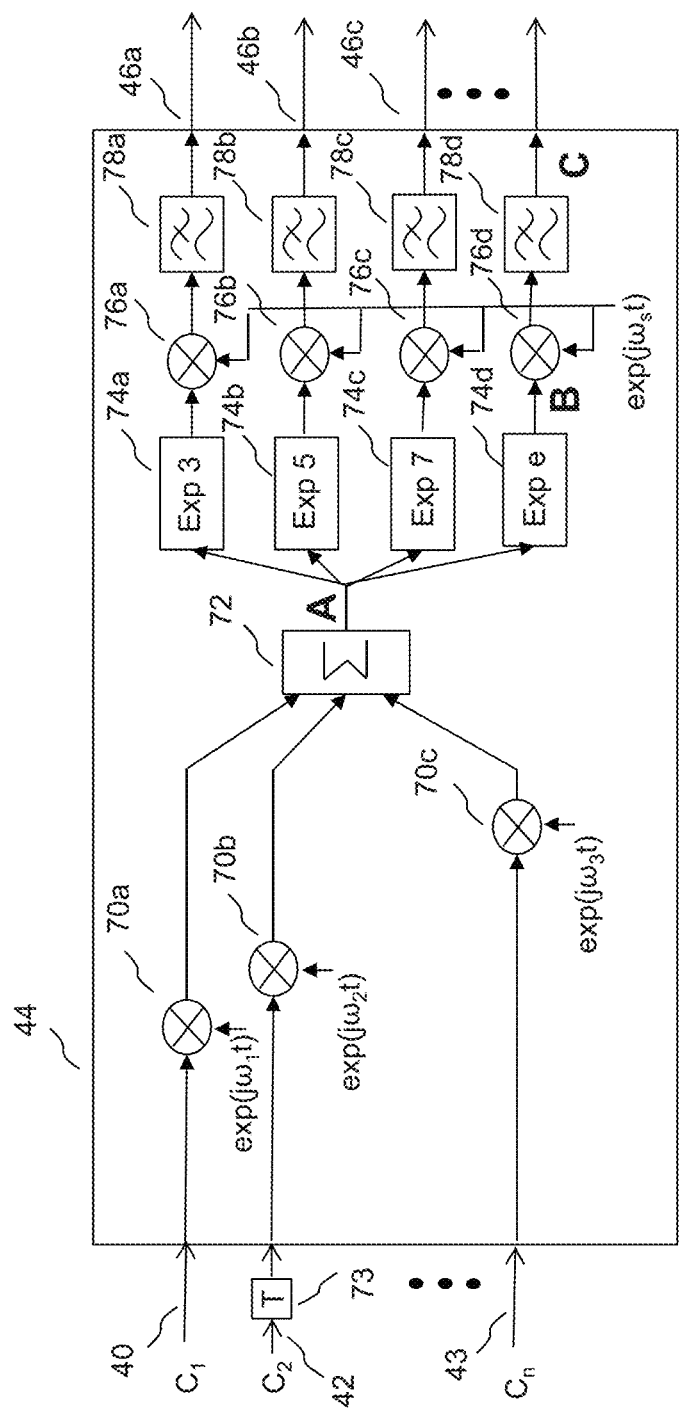
FIG. 9 is a schematic diagram showing generation of a complex composite baseband signal, processing by applying non-linear functions to generate simulated interference in an embodiment of the invention.

FIG. 9 illustrates generation of interference product streams in an embodiment of the invention. The interference product streams 46a, 46b, 46c may be generated by generating a complex composite baseband signal comprising at least the first 40 and second 42 signal, by frequency shifting the first signal to occupy a first frequency range within a composite baseband frequency range, and frequency shifting the second signal to occupy a second frequency range within the composite baseband frequency range, the first frequency range not overlapping the second frequency range. It may be that one of the signals is configured to remain at a non-offset baseband frequency, for example, centered on zero Hertz. The non-offset baseband frequency may be the baseband representation of the signal that is received, for example, from a downlink data stream. In this case, for example, the complex composite baseband signal may be generated by frequency shifting at least one of the first and second signals. As shown in FIG. 9, each signal may be frequency shifted by a complex mixer 70a, 70b, 70c supplied with an appropriate complex local oscillator signal $\exp(j\omega_1 t)$, $\exp(j\omega_2 t)$, $\exp(j\omega_3 t)$. The mixed signals may then be combined using a combiner 72 to form the complex composite baseband signal. Shifting the frequencies of the first and second signals in this way allows a simplified and more efficient signal processing architecture to be implemented, in which the simulated interference is generated by applying the non-linear function to the composite complex, that is to say inphase and quadrature, baseband representation, rather than requiring individual signals to be multiplied together to generate simulated interference. A complex baseband signal is a signal that has inphase and quadrature parts. Baseband is a well known term of the art. Typically, baseband encompasses zero frequency, and allows representation of positive and negative frequencies, the positive and negative frequencies being distinguishable by means of the direction of rotation of a signal vector representing amplitude and phase in the inphase and quadrature representation.

As shown in FIG. 9, at least a first non-linear function, and in this case non-linear functions of Exponent 3 74a, Exponent 5 74b, Exponent 7 74c, and a further exponent value designated Exponent "e" 74d is applied to the complex composite baseband signal to generate simulated interference comprising at least one simulated non-linear product.

In an embodiment of the invention, the first non-linear function relates to a respective non-linear term with a respective exponent value n and has the form:

$|A|^{n-1}A$, wherein A is the composite baseband representation of at least the first and second signal. This allows simulated interference related to a respective exponent value n to be conveniently generated. For example, in this embodiment the first non-linear function may be used to generate simulated interference for odd order exponent values, as previously described, for cases where the term m, the sum of the non-linear product coefficients, is one. The first non-linear function may be configured to generate non-linear products having the phase of the composite baseband representation of at least the first and second signal and having an amplitude linearly related to the amplitude of the composite baseband representation raised to the power of the respective exponent value, for example using the expression $|A|^{n-1}A$.

The process of generating a complex composite baseband signal and then applying a non-linear function to the signal to generate simulated non-linear products may be more efficiently implemented, for example as a programmable gate array, than an alternative method, that involves taking a non-offset baseband representation of the first signal, and a non-offset baseband representation of the second signal, and generating a non-linear product of one applied to the other according to an algebraic relationship for each specific intermodulation product.

As shown in FIG. 9, the composite baseband signal may be processed by applying several non-linear functions, each non-linear function relating to a respective exponent value, to generate simulated non-linear products. For example, third order products, amongst other products, relating to both exponent 3 and exponent 5 values may be generated.

As shown in FIG. 9, selected simulated non-linear products may be frequency shifted by a respective frequency shift, the respective frequency shift being configured to align the respective simulated non-linear product with a respective non-linear product in the received interference. This allows the simulated non-linear products in the simulated interference to be aligned in frequency with non-linear products in the received interference, where the non-linear products in the received interference may also have been frequency shifted, for example to baseband or a composite baseband, or some other intermediate frequency. The alignment allows a correlation operation and/or a cancellation operation to be efficiently performed. As shown in FIG. 9, the frequency shift may be performed by a complex mixer 76a, 76b, 76c, 76d, supplied by an appropriate complex local oscillator signal exp(jω_st). As shown in FIG. 9, a common local oscillator is used for the simulated products produced by the several non-linear functions, but in alternative embodiments a different local oscillator frequency and frequency shift may be used for each or some of the outputs of the non-linear functions. Each mixer output may be filtered, for example by a low pass filter 78a, 78b, 78c, 78d to select an appropriate non-linear product produced by the non-linear function for use in producing simulated interference. The respective frequency shift may be used to align more than one simulated non-linear product of the same order, but for a different exponent value.

The received interference may comprise non-linear products of at least a first signal $C_1$, a second signal $C_2$, and a third signal $C_n$, and as shown in FIG. 9, the complex composite baseband signal may comprise at least the first, second and third signals. This allows processing of interference caused, for example, by intermodulation products of three or more signals.

Figure 10:
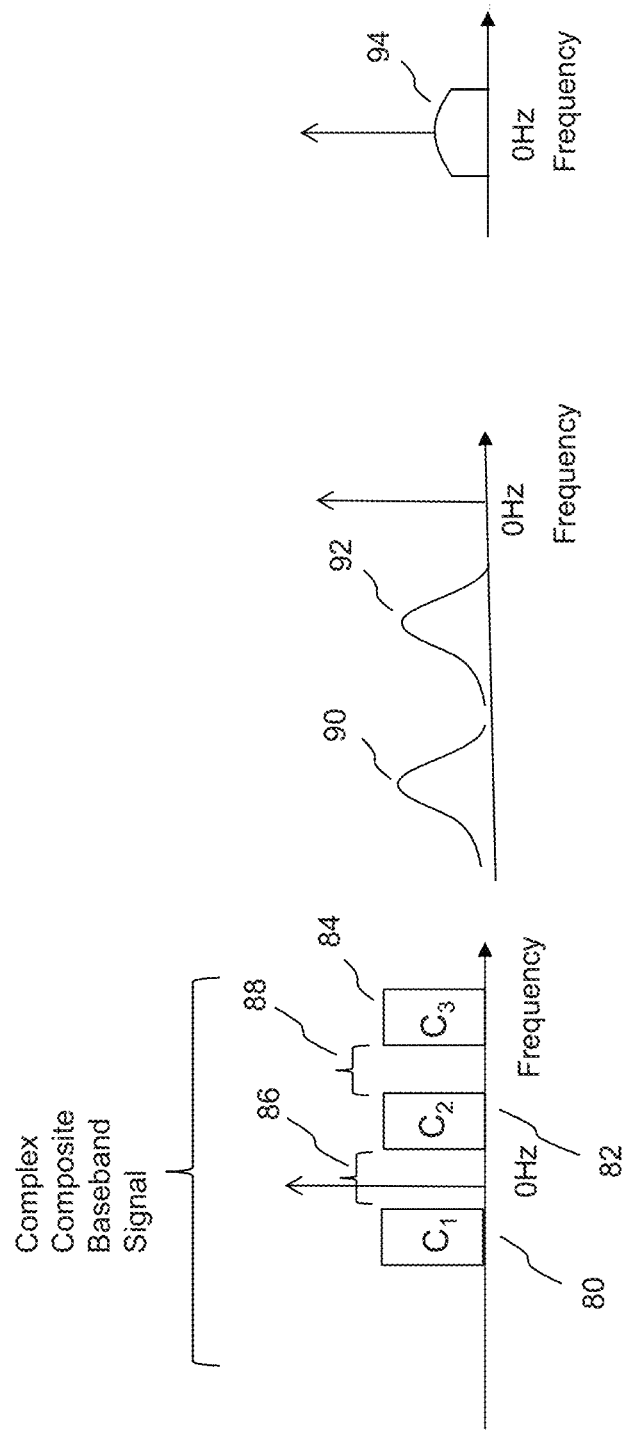
FIG. 10A is a schematic diagram showing a frequency spectrum, at point A of FIG. 9, of a complex composite baseband signal having signals frequency shifted to provide guard bands in an embodiment of the invention.
FIG. 10B is a schematic diagram showing a frequency spectrum, at point B of FIG. 9, of two simulated non-linear products in an embodiment of the invention.
FIG. 10C is a schematic diagram showing a frequency spectrum, at point C of FIG. 9, of a simulated non-linear product frequency shifted to baseband to align in frequency with received interference in an embodiment of the invention.

FIG. 10A shows an example of a complex composite baseband signal in the frequency domain. The first signal occupies a first frequency range 80, the second signal occupies a second frequency range 82. In this example a third signal occupies a third frequency range 84. Considering first the case of a complex composite baseband signal comprising the first and second signals, the difference in frequency between the center of the first frequency range and the center of the second frequency range may be configured to be different from the difference in frequency between the first carrier frequency and the second carrier frequency. Provided that the interference product streams may be separately processed, it has been found that the relative frequency and phase of the signals in the composite signal may be varied from those of the signals that caused the intermodulation interference. It is not obvious that this may be the case. It may have been expected that the difference at baseband would need to be the same as the difference between the first and second carrier frequencies, in order to generate simulated interference that could be used to process the received interference. Configuring the frequency differences at baseband and carrier frequency to be different from each other allows flexibility in positioning the first and second signals in the complex baseband representation, potentially simplifying implementation.

The difference in frequency between the center of the first frequency range and the center of the second frequency range may be configured to be less than the difference in frequency between the first carrier frequency and the second carrier frequency, which allows the bandwidth of the complex composite baseband signal to be reduced, allowing use of a reduced sampling rate.

As shown in FIG. 10A, a guard band 86 may be configured between the first frequency range 80 and the second frequency range 88, the width of the guard band in frequency being configured to be sufficient to prevent a simulated non-linear product corresponding to a non-linear product in the received interference overlapping in frequency with another non-linear product generated by the same non-linear function, or to limit the degree of overlap to acceptable levels. In an embodiment of the invention, the guard band may be configured to be sufficient to prevent any two given simulated non-linear products generated by the same non-linear function overlapping in frequency. FIG. 10B shows two non-linear products 90, 92 separated in frequency. This allows the simulated non-linear products to be processed independently of one another. For example they may be frequency shifted, phase and amplitude shifted, and correlated independently of each other. As shown in FIG. 10C, a simulated non-linear product of interest, for example non-linear product 92, may be mixed to the center of baseband 94, encompassing 0 Hz, for convenient filtering and use as a stream of time samples of simulated interference products to be correlated with the received signal, and/or to be suitably weighted for cancellation of interference in the received waveform.

Considering the case illustrated in FIGS. 10A, 10B and 10C, in which three signals 80, 82 and 84 are used to generate a complex composite baseband signal, this applies to the case where the received interference comprises non-linear products of at least the first signal, the second signal, and a third signal, the third signal having a third carrier frequency. In this case, the complex composite baseband signal is generated to comprise at least the first, second, and third signal, by frequency shifting the first, second, and third signal to occupy a first, second and third frequency range respectively within the composite baseband frequency range, the third frequency range not overlapping the first or second frequency range, and the first and second frequency ranges not overlapping.

Shifting the frequencies of the first, second and third signals in this way allows a simplified and more efficient signal processing architecture to be implemented, in which the simulated interference is generated by applying the non-linear function to the composite complex, that is to say inphase and quadrature (IQ) baseband representation, rather than requiring individual signals to be multiplied together to generate simulated interference.

As shown in FIG. 10A, guard bands 86, 88 may be configured between the frequency ranges, the width of the respective guard bands in frequency being configured to be sufficient to prevent simulated non-linear products which occur at frequencies which would be frequency shifted in the processing of the interference to be within the same frequency range as the receiver baseband frequency range overlapping in frequency with other simulated non-linear products generated by the same non-linear function. The guard bands are accordingly configured to prevent a simulated non-linear product which corresponds to a received non-linear product in the received interference overlapping in frequency with any other simulated non-linear product generated by the same non-linear function. This allows simulated non-linear products to be processed independently of one another. For example they may be frequency shifted, phase and amplitude shifted, orthogonalized and correlated independently of each other. Furthermore, spurious non-linear products may be prevented from interfering with the processing. As shown in FIGS. 5A and 5B, the frequencies of the first, second and third signals in the complex baseband signal are configured to produce simulated non-linear products that are separated in frequency. In an embodiment of the invention, the guard bands may be configured to be sufficient to prevent any two given simulated non-linear products generated by the same non-linear function overlapping in frequency, or to limit a degree of overlap to acceptable levels. In particular, a simulated non-linear product for use in processing the interference, for example in cancelling the interference, may be prevented from overlapping with another non-linear product that is not intended to be used in processing the interference, or the degree of overlap may be limited to an acceptable level that does not cause unacceptable levels of interference.

Figure 11:
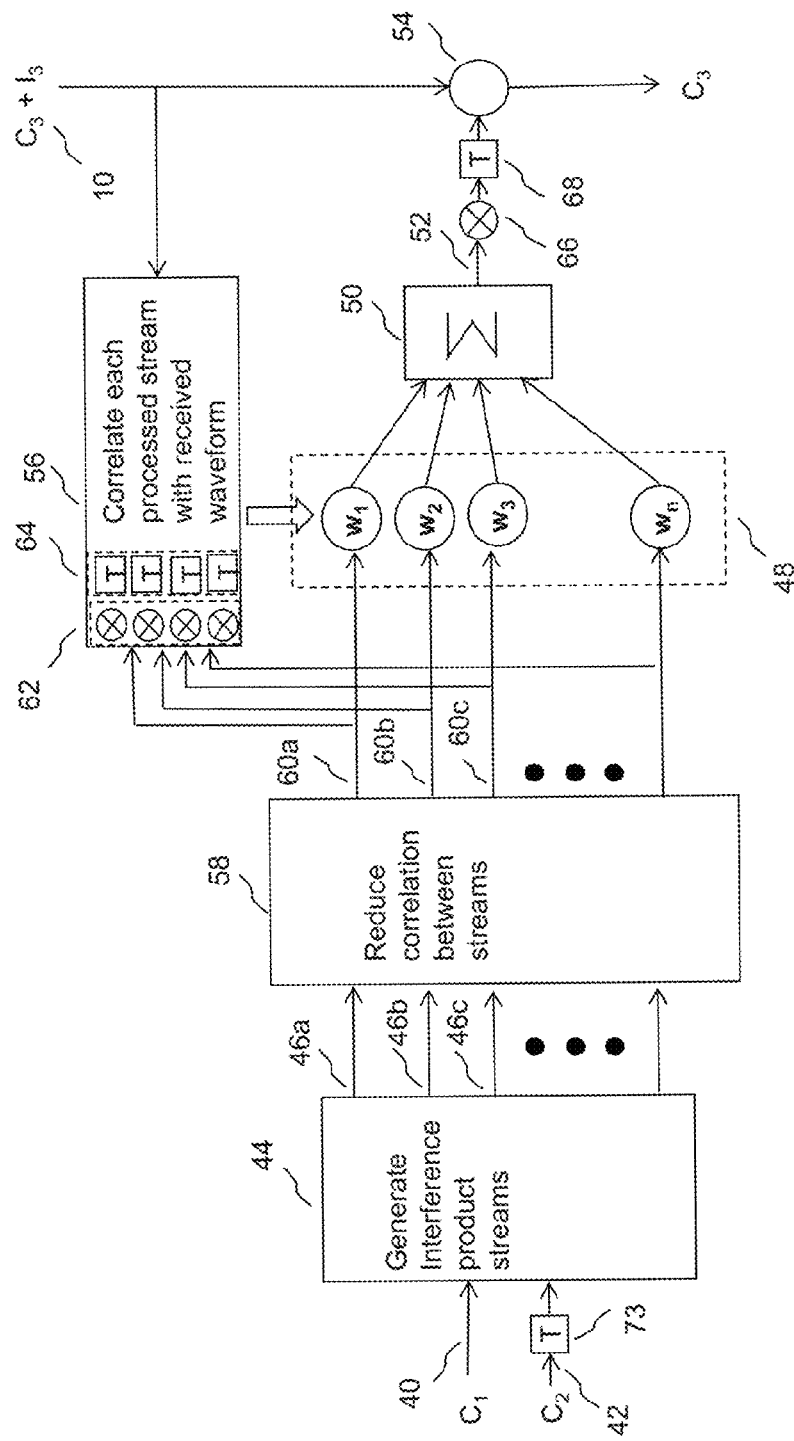
FIG. 11 is a schematic diagram illustrating reduction of interference caused by a passive non-linear product by combination of weighted interference product streams with a received waveform in an embodiment of the invention.

As shown in FIG. 11, each interference product stream, generated in a generator functional block 44 from at least a first signal $C_1$ 40 and in this example from a second signal $C_2$ 42 may be correlated in a correlator functional block 56 with a received waveform, in this case the received waveform comprising $C_3+I_3$, to produce a correlation value for each stream. Each correlation value may be used to produce a weight for the respective stream, the weights forming a weightset 48. Each weight may be applied to the respective interference product stream 46a, 46b, and the weighted streams may be summed in a summer 50 and to produce a simulated interference signal 52 which may be combined in a combiner 54 with the received waveform 10, in appropriately delayed and/or frequency shifted form, to reduce or cancel the interference $I_3$. Appropriate delays may be set in the cancellation paths to ensure that the time samples of the simulated non-linear product align in time with the interference which they are intended to cancel, since the interference is time variant in dependence on the content of the first and second signals in terms of amplitude and phase modulation. The amplitude and phase modulation may be as a result of, for example, OFDM, CDMA or GMSK modulation schemes used by the first and second signals A and B.

It has been found that the interference product streams 46a, 46b may interact to reduce the degree of cancellation. As shown in FIG. 11, in an embodiment of the invention, at least two of the interference product streams 46a, 46b may be processed in a processing functional block 58 to reduce a degree of correlation between the streams, but this processing step is not essential. This may involve orthogonalizing the streams with respect to each other. Each stream may be orthogonalized with respect to each other stream. The at least two processed interference product streams 60a, 60b may be weighted by a weightset 48 and combined in a combiner 50 to produce a simulated interference signal 52 for use in cancelling interference in the received waveform.

As shown in FIG. 11, the processed, for example orthogonalized, interference product streams 60a, 60b may be correlated using a correlator functional block 56 with a received waveform 10 to produce a correlation value for each stream. The interference may then be processed in dependence on the respective correlation values. For example, each correlation value may be used to produce a weight, typically a complex number representing an amplitude and phase to be multiplied with each time sample, for the respective stream, forming a weightset 48. The correlation process in the correlation functional block 56 may involve multiplying the complex conjugate of each time sample of an interference product stream with a corresponding time sample of the received waveform, and averaging the resulting correlation for a number of samples to produce a result used to determine the respective weight. Each weight may be applied to the respective processed interference product stream 60a, 60b and the weighted streams may be summed using a summer 50 with the received waveform 10 comprising $C_3$ and $I_3$, in appropriately delayed and/or frequency shifted form, to reduce or cancel the interference.

It may be necessary to frequency shift the interference product streams with respect to the received waveform at baseband to reduce or cancel the interference in the received signal, so that simulated non-linear products are aligned in frequency with the corresponding non-linear products in the interference to the received waveform. For example this may be needed because, as shown in FIG. 2, the center frequency of the non-linear products interfering with the received signal may not correspond with the center frequency of the received uplink channel of the received signal, but may be offset by an offset frequency.

As shown in FIG. 11, each processed interference product stream may be frequency shifted in a frequency shifting functional block 62 before correlation in the correlation functional block 56 relative to the received waveform. Also as shown in FIG. 11, the interference product streams may be frequency shifted in a frequency shifting functional block, such as a mixer, 66 relative to the received signal. In each case the relative frequency shifting may be achieved by frequency shifting the interference product streams and/or the received waveform.

As also shown in FIG. 11, the relative delay between the interference product streams and the received waveform may be adjusted by delay components 64, 68. Alternatively or in addition, the relative delay between the interference product streams and the received waveform may be adjusted by delay components applied to the first and second signals 40, 42. In each case, the relative delay adjustment may be achieved by delay shifting the interference product streams and/or the received waveform. In addition, the relative delay between two signals $C_1$ 40 and $C_2$ 42 used to generate the interference product streams 46a, 46b may be adjusted, for example by using a delay element 73, by delaying either one in relation to the other. Each delay value applied by a respective delay element 73, 64 may be determined by varying the delay value and choosing a value that increases or maximizes a correlation value. A relative delay, for example as provided by a delay element 68 between the combined interference product streams and the received waveform 10, may be determined by varying a delay value applied by a delay element 62, for example to find a delay value to maximize the correlation, in a signal path to the correlation functional block 56. FIG. 11 shows the positions of frequency and delay adjustment elements in respective signal paths for the sake of example; it will be understood that other positions within the signal path could be chosen with a similar effect.

In the functional block 58, correlation between interference product streams may be reduced by processing interference product streams 46a, 46b, 46c by linear combination of the streams to produce mutually orthogonalized interference product streams 60a, 60b, 60c. The linear combination may be achieved by applying a weighting matrix that applies amplitude and phase weight to each interference product stream, for combination potentially with each other interference product stream. Some of the weighting values may be set to zero, so that in practice not all streams need be combined with all other streams. The weighting matrix may be calculated by a processor arranged to calculate the values of the weights in the weighting matrix, which may also be referred to as orthogonalization coefficients.

At least one processed interference product stream 60b may be a linear combination of the at least two of the plurality of interference product streams 46a, 46b. Each time sample of each processed interference product stream may be a linear combination of each corresponding time sample of each of the interference product streams, so that the processed interference product streams may be produced on the basis of current time samples in a real time process.

The processing of the interference product streams to reduce a degree of correlation between the interference product streams may comprise an orthogonalization process that involves processing a correlation matrix representing correlations between the interference product streams to produce a second matrix, which may be referred to as a weighting matrix. The interference product streams may be multiplied by the second matrix to produce the processed interference streams. The correlation matrix may be calculated on the basis of samples of the interference product streams received during a first period, and the processing of the interference product streams to reduce the degree of correlation between the streams may use samples of the interference product streams received during a second period, different from the first period. The calculation of the correlation matrix may be performed infrequently or in non-real time to produce the second matrix, reducing the requirement for processing resource and the second matrix may be applied in real time. Application of the second matrix, which may involve weighting and summing some or all of the plurality of interference product streams, may be relatively straightforward and less demanding of processing resources to perform in real time in comparison with the calculation of the correlation matrix, which may not need to be performed in real time. This may be particularly advantageous when the correlation matrix is expected to be static or slowly varying in relation to the sampling time. So, although the correlation matrix may represent statistical properties, such as amplitude distribution, of the interference product streams received during the first period, provided the statistical properties of the interference product streams remain substantially constant or are slowly varying, the calculation representing interference streams received in the first period may be expected to be valid outside the first period. As a result, occasional re-calculation of the correlation matrix may be sufficient.

The processing of the first matrix, the 'correlation matrix', to produce the second matrix, the 'orthogonalizing matrix', may comprise determining the inverse of the square root of the correlation matrix. This may be applicable if, for example, it is known or expected that the correlation matrix will consist of values which are wholly or substantially real-valued. So, the matrix square root D of the correlation matrix R may be found, defined by DD=R and then the inverse of that may be found, namely inv(D).

Alternatively the second matrix may be produced by a process involving a decomposition, for example the Cholesky decomposition, which decomposes a correlation matrix, which may be complex, into a product of a matrix with the Hermitian conjugate of itself defined by D*D=R (where * denotes Hermitian transpose). Using a Cholesky decomposition has the advantage that the second matrix, derived by matrix inversion from the matrix obtained via the Cholesky decomposition, should have a triangular form, in which some of the terms typically have a value of 0, so that the process of processing interference product streams by applying the second matrix in the form of weights is simplified, as some weights will typically have the trivial values of 0. The method according to an embodiment of the invention may involve Cholesky decomposition of either the inverse of the correlation matrix or alternatively calculating the inverse of the decomposition. The latter order may have the advantage of simplifying the matrix inverse calculation as the Cholesky decomposition will typically result in a triangular matrix.

An alternative approach to the linear combination of interference product streams, involving vector decomposition, may be according to a Gram-Schmidt orthogonalization process. In this approach, a first interference product stream 46a is used as the first of the orthogonalized interference product streams 60a. A sample of the first interference product stream is then weighted and combined with a second interference product stream 46b, in such a way as to reduce the correlation between the first and second streams. In effect, the weight is arranged to cancel the component of the first interference product stream that is correlated with the second interference product stream, over a period in which samples of each stream are taken. This may be achieved by vector decomposition of the second interference product stream into a decomposed interference product stream which is arranged to be correlated with the first interference product stream, and from this, by the Gram-Schmidt process, a second decomposed interference product stream is produced which is arranged to be substantially orthogonal to the first interference product streams. The second decomposed interference product stream then forms the second orthogonalized interference product stream 60b.

The process continues by processing of a third interference product stream to reduce the correlation with the first and second processed streams. Samples of the first interference product stream and the second orthogonalized interference product streams are respectively weighted and combined with the third interference product stream 46c, in such a way as to reduce the correlation with the first stream and the second orthogonalized stream. The weights are arranged to cancel the component of the first interference product stream that is correlated with the third interference product stream, and the component of the second orthogonalized interference product stream that is correlated with the third interference product stream over a period in which samples of each stream are taken. This may be achieved by vector decomposition of the third interference product stream into a decomposed interference product stream which is arranged to be correlated with the first interference product stream, a decomposed interference product stream which is arranged to be correlated with the orthogonalized second interference product stream, and from these, by the Gram-Schmidt process, a third decomposed interference product stream is produced which is arranged to be substantially orthogonal to both the first interference product stream and the second interference product stream. The third decomposed interference product stream then forms the third orthogonalized interference product stream 60c. The process continues in this manner for the other interference product streams, each of which is orthogonalized with respect to the preceding orthogonalization streams.

In the case that the processing of the interference comprises detecting the presence of a non-linear product of at least the first signal in the interference, this is done in dependence on at least one of the plurality of respective correlation values. For example, a threshold may be set, and if a correlation value exceeds the threshold, an indication that the respective non-linear value is present may be generated. For example, a network management system and/or an operator may be alerted that interference comprising the non-linear product has been detected. It may be identified which non-linear products are present in the interference in dependence on the plurality of respective correlation values, so that specific non-linear products may be detected. This may be done with greater confidence than may be the case with un-processed interference product streams. It may be identified to which exponent value a non-linear product present in the interference relates in dependence on at least one of the plurality of respective correlation values, so that a specific exponent value to which a non-linear product relates may be detected with greater confidence than may be the case with un-processed interference product streams. In this way, it may be identified which exponent values relate to non-linear products present in the interference in dependence on the plurality of respective correlation values. The exponent value to which a specific non-linear product relates is typically known since this information is used to generate the non-linear product. Hence if this specific third order product is detected, it may be determined that exponent 5 terms are contributing to the interference. This information may be useful in predicting which frequency bands may experience interference outside the frequency band of the received waveform, since further exponent 5 terms may be expected, and these may fall outside the frequency band of the received waveform.

In an embodiment of the invention, the first signal is transmitted within a first cellular frequency band and the second signal is transmitted within a second cellular frequency band, the first and second cellular frequency bands not being contiguous. This allows first and second signals in different frequency bands, which may be widely spaced in frequency, to be used to generate simulated interference based on a complex composite baseband signal comprising the two signals. This may be an efficient process for generating simulated interference. It is, in particular, not obvious to combine signals from two different bands into a composite baseband signal. The first and second cellular frequency bands may be frequency bands allocated to different operators and/or bands used for different radio access technologies, for example the first band may be used for 3G radio access technology and the second band may be used for LTE radio access technology.

In a further embodiment of the invention one or more of the transmitted signals may be obtained by sampling the transmitted RF signal using a coupler or antenna and down converting the RF signal to complex baseband.

Figure 12:
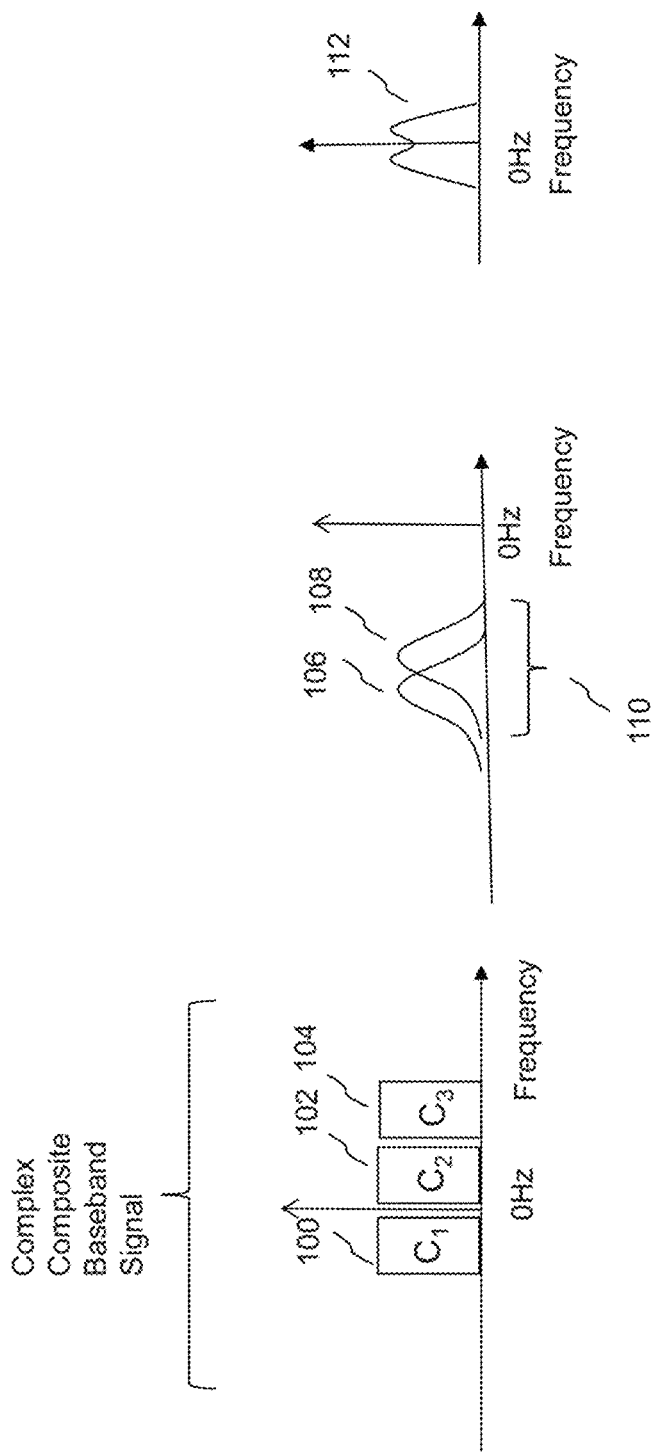
FIG. 12A is a schematic diagram showing a frequency spectrum, at point A of FIG. 13, of a complex composite baseband signal having signals spaced by the same frequency difference as at carrier frequency in an embodiment of the invention.
FIG. 12B is a schematic diagram showing a frequency spectrum, at point B of FIG. 13, of two simulated non-linear products overlapping in frequency in an embodiment of the invention.
FIG. 12C is a schematic diagram showing a frequency spectrum, at point C of FIG. 13, of overlapping simulated non-linear products frequency shifted to baseband to align in frequency with received interference in an embodiment of the invention.
Figure 13:
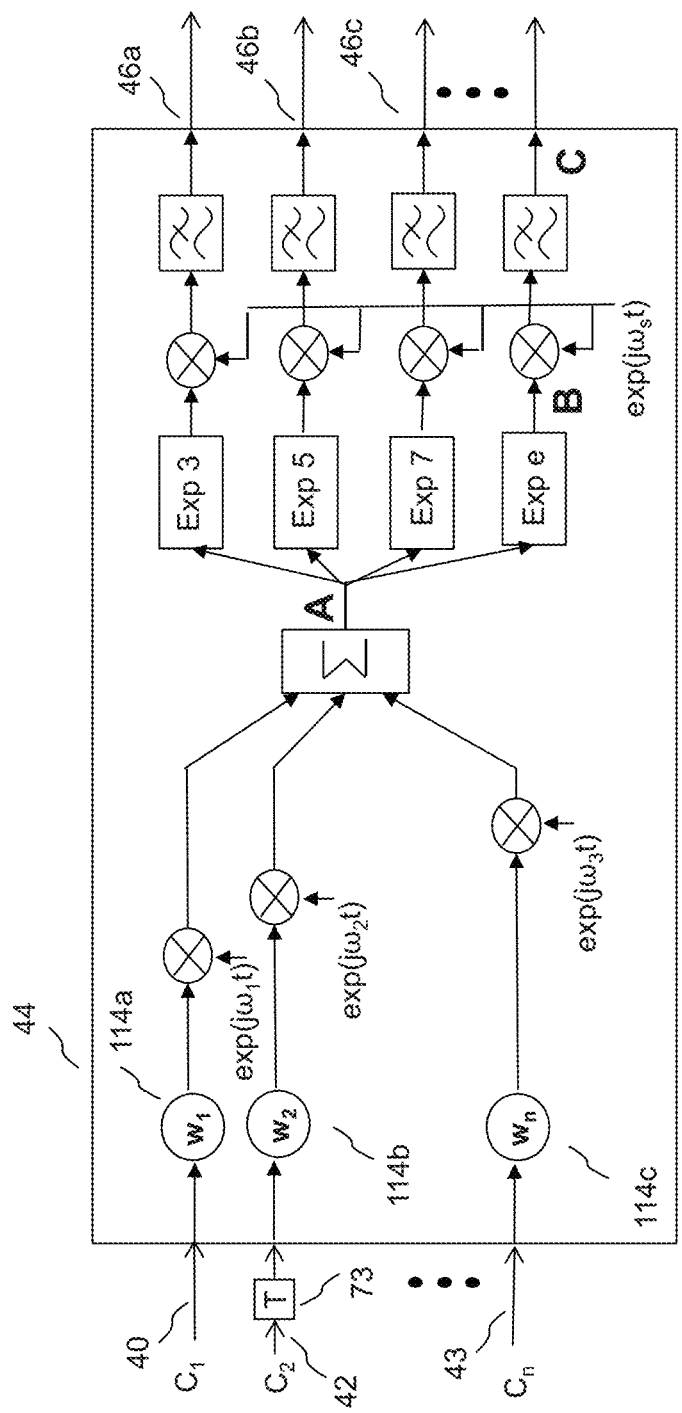
FIG. 13 is schematic diagram showing generation of a complex composite baseband signal from weighted signals, and processing by applying non-linear functions to generate simulated interference in an embodiment of the invention.

As shown in FIG. 13, each of at least the first, second and third signals may be weighted by a respective complex weighting function 114a, 114b, 114c, and the complex composite baseband signal may be configured to comprise the weighted first, second and third signals. This may be particularly applied, for example, to the case where the first second and third signals have the same spacing in frequency from one another at composite baseband as they have at carrier frequency. Processing the complex composite baseband signal by applying at least a first non-linear function may generate simulated interference having overlapping non-linear products 106, 108, as shown in FIGS. 12A and 12B. The simulated interference may be correlated with a representation of the waveform received at the device to produce correlation data, and the respective weighting functions may be adjusted in dependence on the correlation data. Then, the simulated interference generated using adjusted respective weighting functions may be correlated with a representation of the waveform received at the device to produce data representing a correlation. The interference may be processed, for example cancelled or detected, in dependence on the data representing the correlation. This allows a correlation to be performed as the basis for the detection and/or cancellation of interference caused, for example, by intermodulation between three signals 100, 102, 104, in the case where the spacing between the signals at composite baseband is not increased to separate the simulated non-linear products in frequency as shown in FIG. 12A. This has the advantage that the bandwidth and sampling rate of the composite baseband may be reduced compared with the case where guard bands are used.

Interference may be cancelled or detected using non-linear products that overlap in frequency when generated by the non-linear function. Such overlapping products 112 in simulated interference are shown in FIG. 12C. A stream of overlapping products may be used for cancellation or detection as would be a stream of individual simulated non-linear products—the overlapping products may be used to form a correlation or weighted to cancel or reduce interference.

In an embodiment of the invention, the method comprises generating the complex composite baseband signal on the basis of samples of at least the first signal and the second signal derived at baseband from a downlink data stream from a base station baseband unit to a remote radio head unit. This provides a convenient source of at least the first and second signal. The downlink data stream is Common Public Radio Interface (CPRI) or Open Base Station Architecture Initiative (OBSAI) data stream. In an embodiment of the invention, the complex composite baseband signal may be generated on the basis of at least one downconverted signal coupled from a radio frequency transmit signal. This provides a convenient method of obtaining for example the first and/or second signal, in particular if access to a downlink data stream carrying the first and/or second signals is not available.

The functional blocks of a canceller/detector 20 in embodiments of the invention, for example as shown in FIG. 11, may be implemented by means of a processor, typically a digital signal processor. The processor may be implemented using dedicated hardware or firmware logic such as a field programmable gate array, or as a processor arranged to execute computer readable instructions to carry out the functions of the functional blocks, or as a combination of hardware and software elements. Well known methods of implementing digital signal processing and control functions may be used.

FIG. 14 is a flow diagram illustrating a method of processing interference according to an embodiment of the invention according to steps s 14.1 to s 14.4.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing interference in a waveform received at a device in a wireless network, the received interference comprising non-linear products generated from at least a first signal at a first carrier frequency and a second signal at a second carrier frequency, the method comprising:
generating a complex composite baseband signal comprising at least the first and second signal at baseband, the first signal at baseband occupying a first frequency range within a composite baseband frequency range, and the second signal at baseband occupying a second frequency range within the composite baseband frequency range, the first frequency range not overlapping the second frequency range, by frequency shifting at least one of the first and second signals within the composite baseband frequency range;
configuring a difference in frequency between a center of the first frequency range and a center of the second frequency range to be different from a difference in frequency between the first carrier frequency and the second carrier frequency;

processing the complex composite baseband signal by applying at least a first non-linear function to generate simulated interference comprising at least one simulated non-linear product; and processing the received interference in dependence on said simulated interference.

2. The method of claim 1, wherein said first non-linear function generates a first non-linear term with a first exponent value and is configured to generate non-linear products having the phase of the complex composite baseband signal and having an amplitude linearly related to the amplitude of the complex composite baseband signal raised to the power of the respective exponent value.

3. The method of claim 1, wherein said first non-linear function generates a non-linear term with an exponent value n and has the form:

$|A|^{n-1}A$, wherein A is the complex composite baseband signal.

4. The method of claim 1, further comprising:

processing the complex composite baseband signal by applying a plurality of non-linear functions, each non-linear function relating to a respective exponent value, to generate a plurality of simulated non-linear products, wherein said simulated interference comprises said plurality of simulated non-linear products.

5. The method of claim 4, further comprising:

frequency shifting selected ones of said plurality of simulated non-linear products by a respective frequency shift, the respective frequency shift being configured to align the respective simulated non-linear product with a respective non-linear product in the received interference.

6. The method of claim 5, wherein the respective frequency shift is used to align simulated non-linear products of the same order for a plurality of exponent values.

7. The method of claim 1, further comprising:

configuring a guard band between the first frequency range and the second frequency range, the width of the guard band in frequency being configured to limit a degree of overlap in frequency between a simulated non-linear product corresponding to a non-linear product in the received interference and another non-linear product generated by the same non-linear function.

8. The method of claim 1, wherein the received interference comprises non-linear products of at least the first signal at the first carrier frequency, the second signal at the second carrier frequency and a third signal at a third carrier frequency, and wherein the complex composite baseband signal comprises at least the first, second and third signals at baseband.

9. The method of claim 8, further comprising:

generating the complex composite baseband signal to comprise at least the first, second, and third signal at baseband, by frequency shifting the third signal to occupy a third frequency range within the complex composite baseband frequency range, the third frequency range not overlapping the first or second frequency range.

10. The method of claim 9, further comprising configuring a guard band between each frequency range, the width of each guard band in frequency being configured to be sufficient to limit a degree of overlap between said at least one simulated non-linear product and another non-linear product generated by the same non-linear function.

11. The method of claim 8, further comprising:

weighting each of at least the first, second and third signals by a respective complex weighting function;

configuring the complex composite baseband signal to comprise the weighted first, second and third signals, the first, and third signals having the same spacing in frequency from one another at composite baseband as they have at carrier frequency, such that processing the complex composite baseband signal by applying at least a first non-linear function generates simulated interference having overlapping non-linear products;

correlating the simulated interference with a representation of the waveform received at the device to produce correlation data;

adjusting the respective weighting functions in dependence on the correlation data;

correlating simulated interference generated using adjusted respective weighting functions with a representation of the waveform received at the device to produce data representing a correlation; and processing the interference in dependence on the data representing the correlation.

12. The method of claim 1, further comprising:

correlating said at least one simulated non-linear product with a representation of the waveform received at the device to produce data representing a correlation; and processing the interference in dependence on the data representing the correlation.

13. The method of claim 12, wherein said processing of the interference in dependence on the data representing the correlation comprises reducing a level of a non-linear product of at least the first signal and the second signal in the received interference by:

detecting an amplitude and phase of the correlation;

weighting at least said simulated interference in dependence on the detected amplitude and phase; and combining the weighted simulated interference with a frequency-shifted representation of the waveform received at the device.

14. The method of claim 12, wherein said processing of the interference in dependence on the data representing the correlation comprises:

detecting the presence of a non-linear product of at least the first signal and the second signal in the received interference in dependence on the data representing of the correlation.

15. The method of claim 1, wherein the first signal is transmitted within a first cellular frequency band and the second signal is transmitted within a second cellular frequency band, the first and second cellular frequency bands not being contiguous.

16. The method of claim 1, wherein said non-linear products generated from at least the first signal and the second signal in the received interference comprise at least one passive intermodulation (PIM) product of at least the first signal and a second signal.

17. The method of claim 1, further comprising generating the complex composite baseband signal on the basis of samples of at least the first signal and the second signal derived at baseband from a downlink data stream from a base station baseband unit to a remote radio head unit.

18. The method of claim 17, wherein the downlink data stream is Common Public Radio Interface (CPRI) or Open Base Station Architecture Initiative (OBSAI) data stream.

19. The method of claim 1, further comprising generating the complex composite baseband signal on the basis of at least one downconverted signal coupled from a radio frequency transmit signal.

20. An apparatus for processing interference in a waveform received at a device in a wireless network, the received interference comprising non-linear products generated from at least a first signal at a first carrier frequency and a second signal at a second carrier frequency, the apparatus comprising a signal processor configured to:
- generate a complex composite baseband signal comprising at least the first and second signal at baseband, by frequency shifting at least one of the first and second signals within the composite baseband frequency range so that the first signal at baseband occupies a first frequency range within the composite baseband frequency range the second signal at baseband occupies a second frequency range within the composite baseband frequency range, the first frequency range not overlapping the second frequency range;
- configure a difference in frequency between a center of the first frequency range and a center of the second frequency range to be different from a difference in frequency between the first carrier frequency and the second carrier frequency;
- process the complex composite baseband signal by applying at least a first non-linear function to generate at least one simulated non-linear product; and
- process the received interference in dependence on said simulated interference.

* * * * *